(12) United States Patent
Park

(10) Patent No.: US 9,323,271 B2
(45) Date of Patent: Apr. 26, 2016

(54) ELECTRICITY MANAGEMENT APPARATUS AND ELECTRICITY MANAGEMENT METHOD

(75) Inventor: Jongsoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 462 days.

(21) Appl. No.: 13/996,874

(22) PCT Filed: Dec. 24, 2010

(86) PCT No.: PCT/KR2010/009332
§ 371 (c)(1),
(2), (4) Date: Jun. 21, 2013

(87) PCT Pub. No.: WO2012/086865
PCT Pub. Date: Jun. 28, 2012

(65) Prior Publication Data
US 2013/0274944 A1    Oct. 17, 2013

(51) Int. Cl.
*G05F 3/04*  (2006.01)
*H02J 3/14*  (2006.01)

(52) U.S. Cl.
CPC ... *G05F 3/04* (2013.01); *H02J 3/14* (2013.01); *H02J 2003/143* (2013.01);
(Continued)

(58) Field of Classification Search
CPC ............... H02J 3/00; H02J 3/06; H02J 4/00; H02J 13/00; H04Q 9/00; G06F 1/26; G06F 11/30; G06Q 50/00; G01R 22/00; F05B 2270/1033
See application file for complete search history.

(56) References Cited

U.S. PATENT DOCUMENTS

| 5,347,419 A | * | 9/1994 | Caron | ................... B60L 7/003 323/222 |
| 5,751,532 A | * | 5/1998 | Kanuchok | ............ H02H 3/0935 361/115 |

(Continued)

FOREIGN PATENT DOCUMENTS

| CN | 101752864 | 6/2010 |
| JP | 09-009502 | 1/1997 |

(Continued)

OTHER PUBLICATIONS

The State Intellectual Property Office of the People's Republic of China Application Serial No. 201080070930.4, Office Action dated Jan. 7, 2015, 6 pages.

(Continued)

*Primary Examiner* — Crystal J Barnes-Bullock
(74) *Attorney, Agent, or Firm* — Lee, Hong, Degerman, Kang & Waimey

(57) ABSTRACT

An electricity management apparatus includes: a communication unit for receiving electricity information through a smart grid electricity information network, or transmitting electricity management information on an electronic device connected to a network through an internal network; a reference value setting unit for setting a total area, and setting a maximum allowable electricity reference value and an inspection electricity reference value corresponding to the set total area; and a controller for performing controlling to determine a management mode for each electronic device connected to the internal network, in consideration of an electricity proportional value comparing a current accumulated used electricity value comparing a current time to a certain time, when a current inspection used electricity value exceeds the set inspection electricity reference value, and to transmit the electricity management information corresponding to the determined management mode.

21 Claims, 17 Drawing Sheets

(52) U.S. Cl.
CPC ......... *Y02B 70/3225* (2013.01); *Y02B 70/3266* (2013.01); *Y04S 20/222* (2013.01); *Y04S 20/224* (2013.01); *Y04S 20/242* (2013.01)

(56) References Cited

U.S. PATENT DOCUMENTS

| | | | | |
|---|---|---|---|---|
| 6,984,970 | B2* | 1/2006 | Capel | G05F 1/67 323/299 |
| 7,200,503 | B2* | 4/2007 | Lalla | G01D 9/005 702/65 |
| 7,622,830 | B2* | 11/2009 | Cioaca | H02J 7/0006 307/152 |
| 8,612,058 | B2* | 12/2013 | Khajehoddin | G05F 1/67 700/287 |
| 8,686,580 | B2* | 4/2014 | Hearns | F03B 13/12 290/43 |
| 2003/0114963 | A1* | 6/2003 | Walker | G01R 21/133 700/291 |
| 2004/0119292 | A1* | 6/2004 | Datta | F03D 7/0272 290/44 |
| 2008/0178032 | A1 | 7/2008 | Walrath | |
| 2008/0239770 | A1* | 10/2008 | Punzet | H02J 3/1835 363/40 |
| 2010/0039741 | A1* | 2/2010 | Booth | H02H 1/0061 361/63 |
| 2010/0156178 | A1 | 6/2010 | Holmberg | |
| 2011/0051325 | A1* | 3/2011 | Kawasaki | H02J 3/06 361/631 |

FOREIGN PATENT DOCUMENTS

| | | |
|---|---|---|
| JP | 2004-104863 | 4/2004 |
| JP | 2009-254219 | 10/2009 |

OTHER PUBLICATIONS

PCT International Application No. PCT/KR2010/009332, Written Opinion of the International Searching Authority dated Sep. 28, 2011, 23 pages.

* cited by examiner

ELECTRICITY MANAGEMENT APPARATUS AND ELECTRICITY MANAGEMENT METHOD

CROSS REFERENCE TO RELATED APPLICATIONS

This application is the National Stage filing under 35 U.S.C. 371 of International Application No. PCT/KR2010/009332, filed on Dec. 24, 2010, the contents of which are all hereby incorporated by reference herein their entirety.

FIELD OF THE INVENTION

The present invention relates to an electricity management apparatus and an electricity management method.

BACKGROUND ART

Recently, discussions on the research and development of a new power grid, wherein digital technology is grafted onto the related art general analog power grid are being carried out. With respect to the new digital power grid, the research and development of a method for transmitting and receiving power information (or electricity information) in real-time via two-way communication is also being carried out in combination with the information communication technology. For example, a Smart Grid technology, which is extensively referred to as an intelligent power grid, may further be considered as one of the power grid technologies that are being developed accordingly. Hereinafter, the terms 'smart grid electricity information network', 'smart grid', or 'power network' will collectively represent an example of an intelligent power grid provided with two-way communication. For simplicity in the following description of the present invention, the intelligent power grid will be referred to as a 'smart grid electricity information network'. Respectively, the smart grid electricity information network has been implemented by using diverse methods, for example, the smart grid electricity information network may be implemented by using an internet grid or PLC (Power Line Communication), which is extensively used, or the smart grid electricity information network may also be implemented by separately standardizing a new power information grid.

Therefore, as described above, as the discussions on the smart grid electricity information network becomes more active, the requirement for reducing power consumption in electronic devices using electricity is actually increasing. Most particularly, discussions on the decrease in power consumption through an efficient use of electricity are also included herein. Accordingly, it will be apparent that the research and development of an electricity management apparatus (or power control apparatus) and an electricity management method (or power control method), which are capable of performing efficient electricity management (or power control) respective to diverse electronic devices, by using diverse power information (or electricity information) within the smart grid electricity information network is being required.

DETAILED DESCRIPTION OF THE INVENTION

Technical Objects

The present invention seeks to provide an electricity management apparatus and an electricity management method capable of performing efficient electricity management of diverse electronic devices.

The technical objects of the present invention will not be limited only to the objects described above, and any other additional technical objects that have not been mentioned in the description will become apparent to those having ordinary skill in the art upon the following description of the present application.

Technical Solutions

According to an exemplary embodiment of the present invention, an electricity management apparatus includes a communication unit receiving electricity information through a smart grid electricity information network, or transmitting electricity management information respective to an electronic device being connected to a network through an internal network, a reference value set-up unit setting up an overall section, and setting up a maximum permissible electricity reference value and instantaneous electricity reference value respective to the set overall section, and a control unit deciding a management mode for each electronic device being connected to the internal network, when a current instantaneously used electricity value exceeds the set instantaneous electricity reference value, based upon an electricity proportion value comparing a current accumulated used electricity value with respect to the set maximum permissible electricity reference value, and based upon a section proportion value comparing a current time point of the specific section, and performing managing operations, so as to transmit electricity management information respective to the decided management mode.

Additionally, the maximum permissible electricity reference value and instantaneous electricity reference value are decided with reference to at least any one of an electricity fee and an electricity amount.

Moreover, the maximum permissible electricity reference value is set up with any one of a maximum permissible electricity fee or electricity amount by the user during the specific section.

Also, the instantaneous electricity reference value is set up by calculating an instantaneous electricity amount based upon the predetermined maximum permissible electricity reference value and the specific section period.

Also, the management mode is divided into a normal mode, a primary management mode, and a secondary management mode, and the normal mode is executed when the section proportion value is within a predetermined range of exceeding the electricity proportion value.

And, the management mode is divided into a normal mode, a primary management mode, and a secondary management mode, and the primary management mode is executed when the section proportion value and the electricity proportion value are within the same range.

And, in executing the primary management mode, the control unit checks the used electricity amount of each electronic device, and the control unit performs power-saving management with respect to any electronic device exceeding an average electricity.

Additionally, in executing the primary management mode, the control unit uses a display means included in the electricity management apparatus and/or a display means included in the corresponding electronic device having the power-saving management performed therein, and the control unit performs management operations, so as to provide a user alarm message notifying that the power-saving management is being performed.

And, the management mode is divided into a normal mode, a primary management mode, and a secondary management mode, and the secondary management mode is executed when the electricity proportion value is within a predetermined range of exceeding the section proportion value.

Also, in executing the secondary management mode, the control unit checks the used electricity amount of each electronic device, and the control unit categorizes the electronic devices to necessary electronics device and unnecessary electronic devices, so as to perform power-saving management with respect to the necessary electronic devices and to perform power-blocking management with respect to the unnecessary electronic devices.

Moreover, in executing the secondary management mode, the control unit further includes a step of adjusting the instantaneously used reference value to a low level value.

Additionally, in executing the secondary management mode, the control unit uses a display means included in the electricity management apparatus and/or a display means included in the corresponding electronic device having the power-saving management or power-blocking management performed therein, and the control unit performs management operations, so as to provide a user alarm message notifying that the power-saving management is being performed.

According to another exemplary embodiment of the present invention, an electricity management apparatus includes a communication unit receiving electricity information through a smart grid electricity information network, or transmitting electricity management information respective to an electronic device being connected to a network through an internal network, a reference value set-up unit setting up a maximum permissible electricity reference value corresponding to a specific section, an electricity reference value for each sub section after dividing the specific section to a plurality of sub sections, and an instantaneous electricity reference value; and a control unit comparing an accumulated used electricity value at a time point corresponding to a specific sub section with a sub section electricity reference value being set up in the corresponding sub section, and comparing a current instantaneous electricity value with the set instantaneously used reference value, so as to decide a management mode for each electronic device being connected to the internal network, and performing control operations, so as to transmit electricity management information respective to the decided management mode.

Also, the sub section is set up by dividing the overall section into equal sections having the same size.

And, the sub section is set up by dividing the overall section into non-equal sections having different sizes based upon characteristics of the overall section.

And, the management mode is divided into a normal mode, a primary management mode, and a secondary management mode, and the normal mode is executed when the accumulated used electricity value at a time point corresponding to the specific sub section is within a range smaller than the sub section electricity reference value that is set up in the corresponding sub section.

Additionally, the management mode is divided into a normal mode, a primary management mode, and a secondary management mode, and the primary management mode is executed when the accumulated used electricity value at a time point corresponding to the specific sub section exceeds the sub section electricity reference value that is set up in the corresponding sub section and when a current instantaneous electricity value is within a range of not exceeding the set instantaneously used reference value, and, in executing the primary management mode, the control unit checks the used electricity amount of each electronic device, and wherein the control unit performs power-saving management with respect to any electronic device exceeding an average electricity, and, in executing the primary management mode, the control unit uses a display means included in the electricity management apparatus and/or a display means included in the corresponding electronic device having the power-saving management performed therein, and the control unit performs management operations, so as to provide a user alarm message notifying that the power-saving management is being performed.

Moreover, the management mode is divided into a normal mode, a primary management mode, and a secondary management mode, and the secondary management mode is executed when the accumulated used electricity value at a time point corresponding to the specific sub section exceeds the sub section electricity reference value that is set up in the corresponding sub section, and when a current instantaneous electricity value is within a range of exceeding the set instantaneously used reference value, and, in executing the secondary management mode, the control unit checks the used electricity amount of each electronic device, and wherein the control unit categorizes the electronic devices to necessary electronics device and unnecessary electronic devices, so as to perform power-saving management with respect to the necessary electronic devices and to perform power-blocking management with respect to the unnecessary electronic devices, and, in executing the secondary management mode, the control unit further includes a step of adjusting the instantaneously used reference value to a low level value, and, in executing the secondary management mode, the control unit uses a display means included in the electricity management apparatus and/or a display means included in the corresponding electronic device having the power-saving management or power-blocking management performed therein, and wherein the control unit performs management operations, so as to provide a user alarm message notifying that the power-saving management is being performed.

Furthermore, the instantaneous electricity reference value is set up to consist of a first instantaneous electricity reference value and a second instantaneous electricity reference value.

According to an exemplary embodiment of the present invention, an electricity management method includes a reference value set-up step setting up an overall section, and setting up a maximum permissible electricity reference value and instantaneous electricity reference value respective to the set overall section, when a current instantaneously used electricity value exceeds the set instantaneous electricity reference value, a step of calculating an electricity proportion value comparing a current accumulated used electricity value with respect to the set maximum permissible electricity reference value and calculating a section proportion value comparing a current time point of the specific section, and an electricity management step deciding a management mode for each electronic device connected to the internal network, based upon the electricity proportion value and the section proportion value, and performing managing operations, so as to transmit electricity management information respective to the decided management mode.

According to another exemplary embodiment of the present invention, an electricity management method includes a reference value set-up step setting up a maximum permissible electricity reference value corresponding to an overall section, an electricity reference value for each sub section after dividing the specific section to a plurality of sub sections, and an instantaneous electricity reference value, a comparison step comparing an accumulated used electricity value at a time point corresponding to a specific sub section with a sub section electricity reference value being set up in the corresponding sub section, and comparing a current instantaneous electricity value with the set instantaneously used reference value, and an electricity management step deciding a management mode for each electronic device being connected to the internal network, based upon the compared result, and performing control operations, so as to transmit electricity management information respective to the decided management mode.

Also, the set-up reference values are decided with reference to at least any one of an electricity fee or electricity amount.

Effects of the Invention

According to diverse exemplary embodiments proposed in the description of present invention, an efficient electricity management (or power control) may be performed with respect to diverse electronic devices. Additionally, an electricity management mode (or power control mode) that is most adequate (or suitable) to the current time point may be decided and applied.

Additionally, according to the diverse exemplary embodiments proposed in the description of the present invention, electricity management (or power control) ma be performed within a range of not exceeding an initially determined maximum permissible (or allowable) reference value, for example, when the user simply sets up (or determines) an allowable (or permissible) maximum electricity charge fee, the electricity management (or power control) of internal electronic devices may be performed to an extent that the set up maximum permissible electricity charge fee is not exceeded later on.

BEST MODE FOR CARRYING OUT THE PRESENT INVENTION

Hereinafter, diverse exemplary embodiments of the present invention will be described. For reference, the exemplary embodiments of the present invention will be provided only as examples for describing the technical spirit of the present invention, and, therefore, it will be apparent that the technical scope of the present invention will not be limited only to the exemplary embodiments provided and set forth herein.

Figure 1:
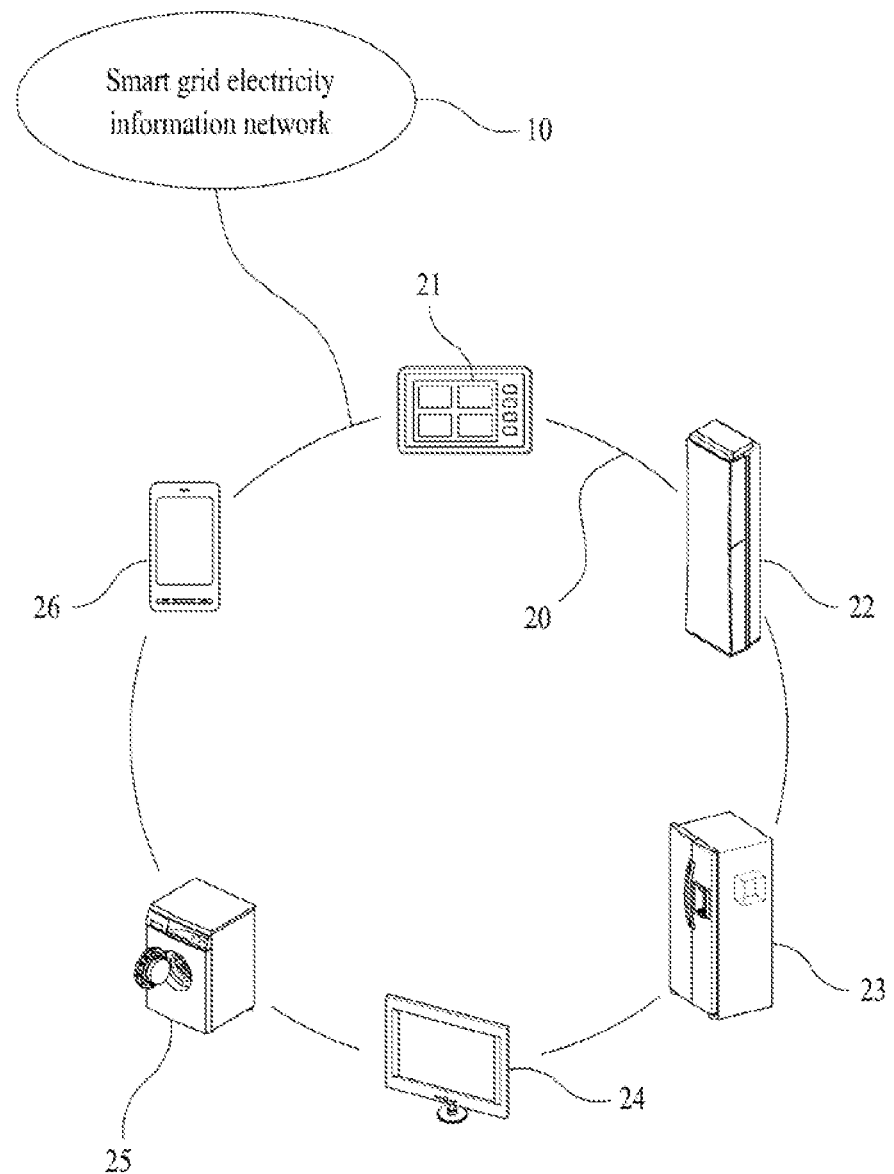
FIG. 1 illustrates a drawing for describing a power (or electricity) usage example using a smart grid electricity (or power) information grid according to an exemplary embodiment of the present invention.

FIG. 1 illustrates a drawing for describing a power (or electricity) usage example using a smart grid electricity (or power) information grid according to an exemplary embodiment of the present invention. Most particularly, FIG. 1 illustrates an example based upon a specific consumer network (20, hereinafter referred to as an 'internal network'), which is connected (or accessed) a smart grid electricity (or power) information grid (10). Diverse electronic devices (21~26) are connected to a network available for communication within the internal network (20), and, for example, an air conditioner (22), a refrigerator (23), a TV (24), a washing machine (25), a portable mobile device (26), and so on, may exist, and an electricity management (or power control) apparatus (21, hereinafter referred to as a 'smart server') controlling and managing the power (or electricity) usage of the electronic devices may separately exist. Respectively, the present invention relates to the structure of the electricity management apparatus (21), which is connected to the smart grid electricity information network (10), and which controls the electricity usage of electronic devices included in the internal network (20) and the electricity management method using the same.

Respectively, although the description of the present invention seeks to describe the electricity management apparatus (21) as an example of a separate independent product, for simplicity in the description, the electricity management apparatus (21) is not imperatively required as an independent product in order to realize the present invention, and, depending upon its usage example, the electricity management apparatus (21) may also replace any one of the specific electronic devices included in the internal network. For example, the configuration of the electricity management apparatus and management method, which are to be described in the description of the present invention, may be included in the TV (24) or portable mobile device (26).

Figure 2:
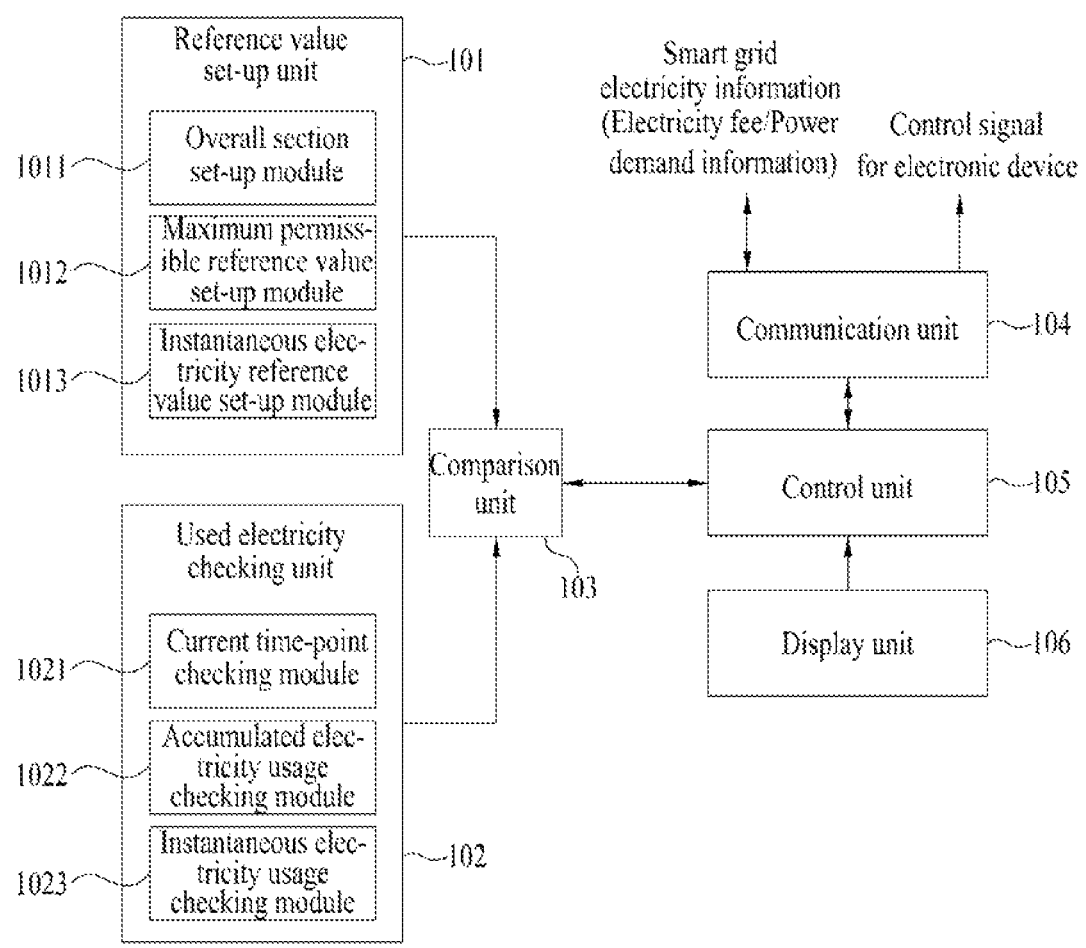
FIG. 2 illustrates an exemplary structure of an electricity management (or power control) apparatus according to the exemplary embodiment of the present invention.
Figure 3:
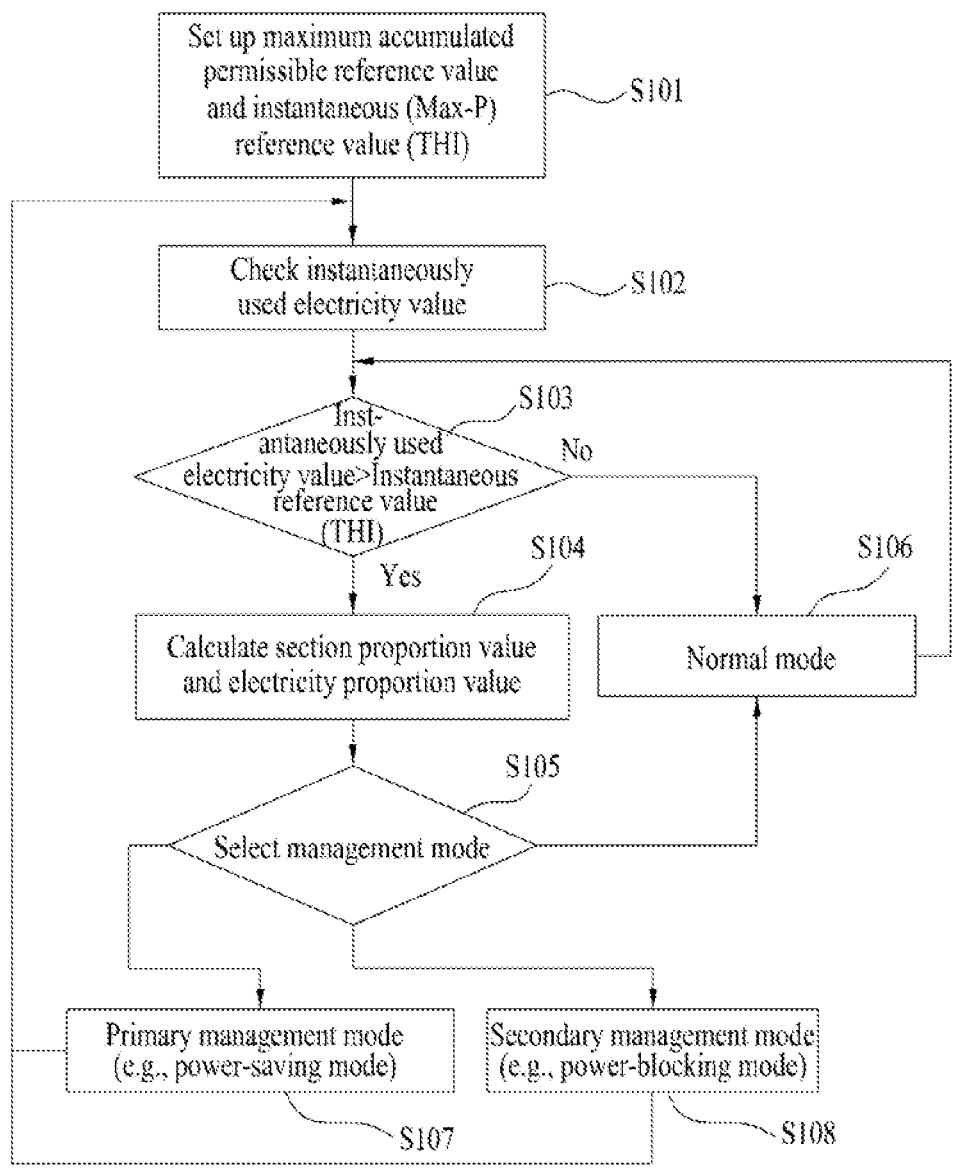
FIG. 3~FIG. 5 respectively illustrate flow charts of an electricity management (or power control) method according to the exemplary embodiment of the present invention.

FIG. 2 illustrates an exemplary structure of an electricity management (or power control) apparatus according to the exemplary embodiment of the present invention. The electricity management apparatus according to the exemplary embodiment of the present invention includes, for example, a reference value set-up unit (101), a used electricity checking unit (102), a comparison unit (103), a communication unit (104), a control unit (105), and a display unit (106). Respectively, the structure is shown in blocks for each function for simplicity in the description, and in the actual implementation, the electricity management apparatus may be configured as a single structure or may be implemented as a software program. Additionally, in the specific exemplary embodiment of the present invention, it will be apparent that part of the elements of the electricity management apparatus may correspond to supplementary elements and not the essential elements of the electricity management apparatus.

The communication unit (104) is connected to the above-described smart grid electricity information network (10), thereby being capable of performing two-way communication, such as receiving electricity information or transmitting the related information. Additionally, the communication unit (104) is connected to the internal network (20), thereby being capable of performing two-way communication with the electronic devices (22~26) accessing and existing within the internal network (20). Most particularly, the communication unit (104) performs the function of transmitting electricity (or power) control signals respective to a control (or management) process of the control unit (105) included in the electricity management apparatus to each of the electronic devices (22~26). Therefore, although the communication unit (104) is illustrated as a single functional block for simplicity in the description of the present invention, as described above, it shall be appropriate to understand the communication unit (104) as a group unit of diverse communication modules (e.g., modules capable of performing wired, wireless, close-range communication) performing multiple communication functions.

The reference value set-up unit (101) sets up a reference value for electricity management and stores the set reference value. The reference value set-up unit (101) includes a total (or overall) section set-up module (1011) setting up specific sections, a maximum permissible reference value set-up module (1012) setting up a maximum reference value that is permitted (or allowed) due to an accumulation within the set total (or overall) section, and an instantaneous electricity reference value set-up module (1013) setting up an instantaneous electricity reference value that is permitted within the set total (or overall) section.

Respectively, the reference value may be decided based upon (or with reference to) at least any one of an electricity fee or amount of electricity. For example, when the reference value is decided based upon the electricity fee, the maximum permissible reference value and the instantaneous reference value may be respectively replaced with a 'maximum permissible electricity fee' and an 'instantaneously used electricity fee'. Conversely, when the reference value is decided based upon the electricity amount, the maximum permissible reference value and the instantaneous reference value may be respectively replaced with a 'maximum permissible reference electricity amount' and an 'instantaneous reference electricity amount'. More specifically, the exemplary embodiment of the present invention may be capable of setting up and using any one of the electricity fee and electricity amount as the reference value. Additionally, depending upon the usage example, even if the user sets of the maximum permissible electricity fee as the reference value (since the user has a greater intention of reducing the electricity usage fee, in light of the user, it shall be more convenient to set to the electricity fee as the reference value), the reference set up unit (101) may calculate and set up an electricity amount corresponding to the set up electricity fee as the internal system reference. In this case, based upon real-time or section-specific electricity fee information, which are received through the above-described smart grid electricity information network (10), the electricity amount may be converted and set up. Additionally, the set-up may be performed in the opposite case. More specifically, the reference value that is set up with the electricity amount may be converted to the electricity fee, so as to be used as the internal system reference, and, in this case also, the electricity fee information, which is received through the electricity information grid (10), may be used.

Additionally, the used electricity checking unit (102) performs the function of verifying the electricity usage state of the electronic devices (e.g., FIG. 1 22~26) within the current internal network (20). The used electricity checking unit (102) includes a current time-point checking module (1021) checking a current time point within the set up total (or overall) section, an accumulated electricity usage checking module (1022) checking the accumulated electricity usage value up to the current time point, and an instantaneous electricity usage checking module (1023) checking an instantaneous electricity value at the current time point.

Moreover, the comparison unit (103) performs a comparison process between each set of information within the above-described reference value set-up unit (101) and used electricity checking unit (102), in accordance with the control of the control unit (105). Based upon the compared result, a 'section ratio value' and an 'electricity ratio value' are calculated, and these will be described later on in more detail.

In addition to controlling the overall elements within the electricity management apparatus, the control unit (105) decides a 'management mode' for each electronic device within the internal network (20), based upon the result of the comparison unit (103), and then generates respective electricity management signals, thereby performing control (or management) operations allowing the generated electricity management signals to be transmitted through the communication unit (104). Respectively, the management mode that is decided by the control unit (105) may, for example, consist of a normal mode, a primary management mode (e.g., power saving mode), and a secondary management mode (e.g., power blocking mode), and these will be described later on in more detail.

The display unit (106) consists of a means that can be audibly and/or visually recognized by the user and that is provided on a circumference of the electricity management apparatus. The electricity management apparatus is thus capable of providing diverse information to the user through the display unit (106), and, most particularly, in accordance with the control process of the control unit (105), the electricity management apparatus is also capable of providing a 'user alarm message' best-fitting the above-described management mode to the user.

Hereinafter, the electricity management method according to the exemplary embodiment of the present invention will hereinafter be described in detail with reference to FIG. 3~FIG. 9.

First of all, due to the user or system, a specific section within the above-described reference value set-up unit (101) is set-up (or determined) as the overall section, or a maximum permissible electricity reference value (Max-P) that is permitted (or allowed) due to an accumulated usage and an instantaneous electricity reference value (THI) are set up within the set overall section (S101). For example, the overall section may be set up in monthly units or weekly units, and the reference value may be set up based upon the electricity fee or electricity amount. Therefore, more specifically, for example, in a monthly-unit overall section, '30,000 won' (i.e., maximum permissible electricity fee) may be set as the maximum permissible electricity reference value (Max-P), and '500 won' (i.e., instantaneous electricity fee) may be set as the instantaneous electricity reference value (THI). Alternatively, for example, in the monthly-unit overall section, '30,000 won' (i.e., maximum permissible electricity fee) may be set as the maximum permissible electricity reference value (Max-P), and '10 Kwh' (i.e., instantaneous electricity amount) may be set as the instantaneous electricity reference value (THI). Additionally, when the user sets up the overall section and the maximum permissible electricity reference value (Max-P), the system (e.g., control unit (105)) may be capable of setting up the instantaneous electricity reference value (THI) in a later process based upon the set overall section and maximum permissible electricity reference value (Max-P).

Thereafter, the control unit (105) checks the instantaneously used electricity value, which is used by the electronic devices within the internal network (20) at the current time point, through the instantaneous electricity usage checking module (1023) within the above-described used electricity checking unit (102) (S102). Respectively, it will be apparent that, in case the set up instantaneous electricity reference value (THI) corresponds to the electricity fee, the instantaneously used electricity value can be converted to the instantaneously used electricity fee, so as to be checked, and that, in case the instantaneous electricity reference value (THI) corresponds to the electricity amount, the instantaneously used electricity value may be checked as the instantaneously used electricity amount.

Figure 6:
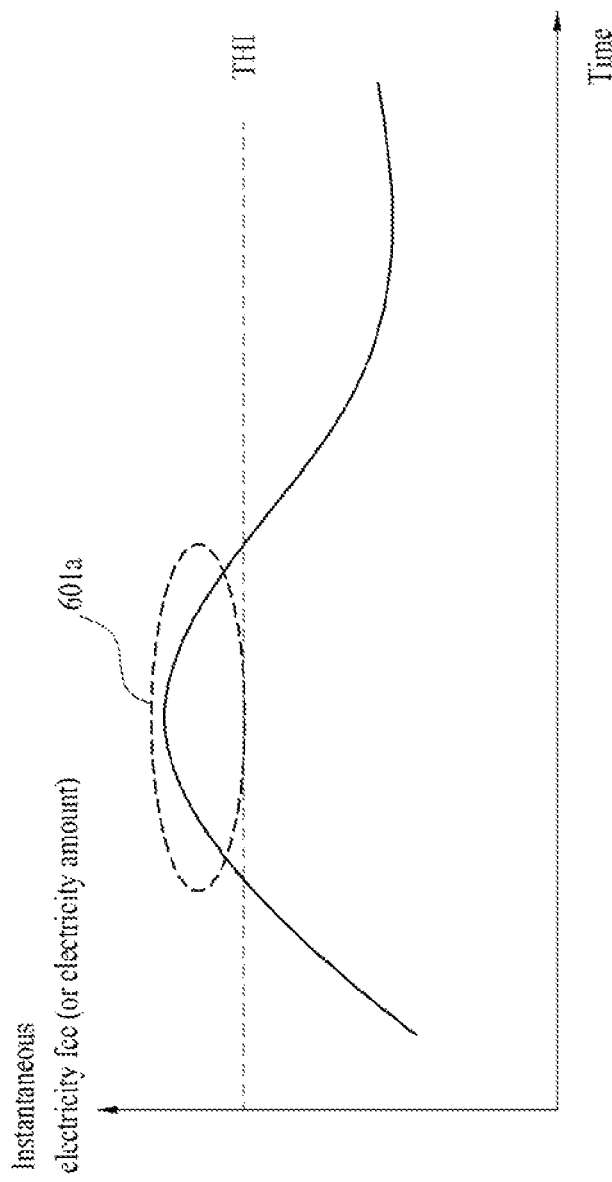
FIG. 6~FIG. 9 respectively illustrate electricity usage graphs for describing the electricity management (or power control) method according to the exemplary embodiment of the present invention.

After process step S102, the above-described comparison unit (103) compares the instantaneously used electricity value at the checked current time point and the set instantaneous electricity reference value (THI) (S103). Based upon the compared result, when the current instantaneously used electricity value is smaller than the set up instantaneous electricity reference value, this may be determined as a normal process step, and, therefore, the electricity management may be operated (or performed) based upon the normal mode (S106). The normal mode refers to maintaining the electricity management mode that is currently being operated and also refers to an electricity management mode that does not perform any additional electricity management (or control) within respect to each electronic device. Respectively, FIG. 6 illustrates an exemplary graph showing an instantaneously used electricity value that is being compared with the instantaneous electricity reference value (THI). 601a section of FIG. 6 is determined as a time point when the instantaneously used electricity value exceeds the instantaneous electricity reference value (THI), and the remaining sections may be determined as time points when the instantaneously used electricity value is less than the instantaneous electricity reference value (THI).

If the current instantaneously used electricity value exceeds the set instantaneous electricity reference value (e.g., time point within the 601a section of FIG. 6), the control unit (105) calculates a 'section proportion value' and an 'electricity proportion value' (S104). The 'section proportion value' and 'electricity proportion value' are calculated based upon the compared result within the above-described comparison unit (103). More specifically, the section proportion value refers to a value that is proportionally calculated after comparing the current time point of the specific overall section. For example, when the overall section correspond to '30 days', and when the current time point corresponds to '10 days' after the starting point of the overall section, the section proportion value is calculated to approximately 33%. Additionally, the power proportion value refers to a value that is proportionally calculated after comparing the currently checked accumulated used electricity value with respect to the set maximum permissible electricity reference value. For example, when the maximum permissible electricity reference value corresponds to '30,000 won', and when the current time point accumulated used electricity value corresponds to '15,000 won', the electricity proportion value is calculated as 50%.

Thereafter, the control unit (105) selects a management mode (or control mode) based upon the section proportion value and the electricity proportion value, which are calculated in step S104 (S105). Respectively, the management mode may, for example, consist of a normal mode (S106), a primary management mode (S107), and a secondary management mode (S108).

Figure 7:
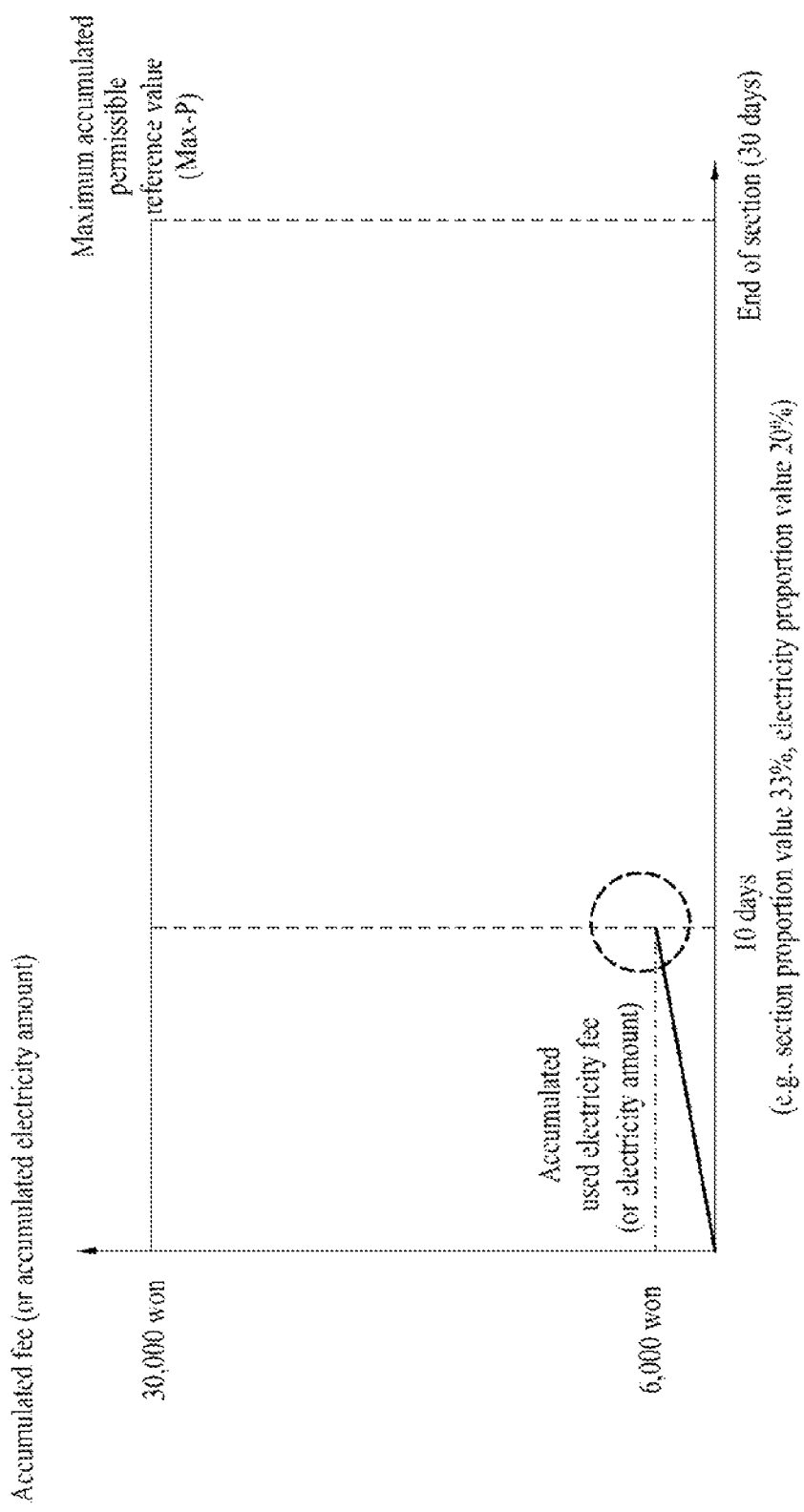

First of all, the normal mode (S106) is executed when the section proportion value exceeds the electricity proportion value up to more than the reference difference value (e.g., predetermined as 1%, 3%, or 5%). Respectively, FIG. 7 illustrates an exemplary graph showing the section proportion value and the electricity proportion value corresponding to the normal mode. According to FIG. 7, since the overall section is set to '30 days', and since the current time point corresponds to the first '10 days' of the overall section, the section proportion value corresponds to approximately '33%'. Additionally, since the maximum permissible electricity reference value (Max-P) corresponds to '30,000 won', and since the current time point accumulated used electricity value corresponds to '6,000 won', the electricity proportion value is calculated as '20%'. Accordingly, when the reference difference value is set to 5%, according to the example shown in FIG. 7, since the section proportion value (33%) is greater than the electricity proportion value (20%) by 13%, the management mode may eventually be determined as the 'normal mode'. More specifically, in this process step, the 'normal mode' indicates that the current accumulated used electricity has been sufficiently and adequately managed as compared to the remaining sections, which remain for the usage of the electricity, and, therefore, even if the instantaneously used electricity value temporarily exceeds the instantaneous electricity reference value (THI), this indicates that an electricity management (or power control) process enabling additional electricity (or power) saving (e.g., power saving mode or power blocking mode) has not been applied herein.

Figure 8:
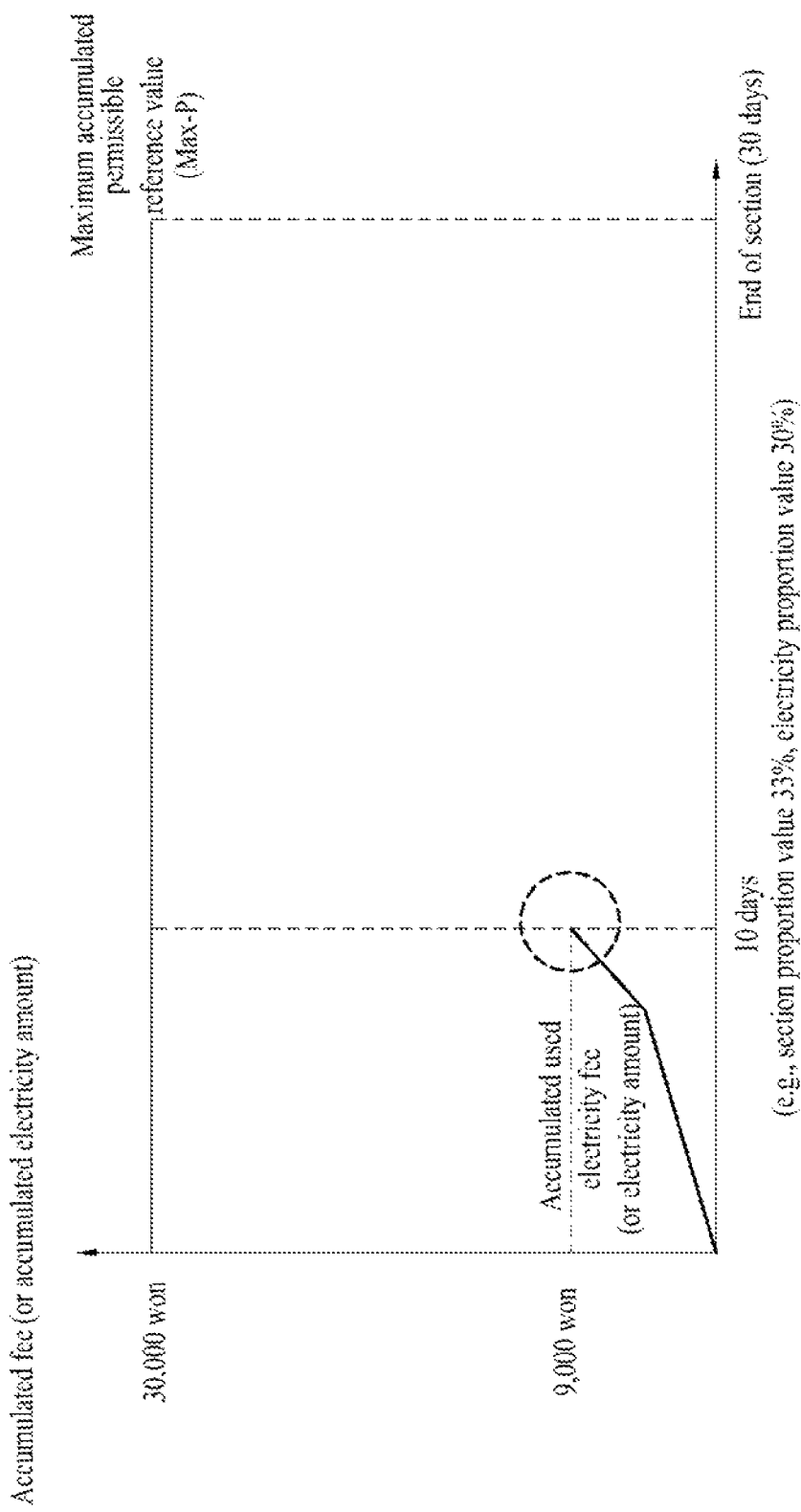

Additionally, the primary management mode (S107) is executed when the difference value between the section proportion value and the electricity proportion value is within the reference difference value (e.g., predetermined as 1%, 3%, or 5%) range. Respectively, FIG. 8 illustrates an exemplary graph showing the section proportion value and the electricity proportion value corresponding to the primary management mode. According to FIG. 8, since the overall section is set to '30 days', and since the current time point corresponds to the first '10 days' of the overall section, the section proportion value corresponds to approximately '33%'. Additionally, since the maximum permissible electricity reference value (Max-P) corresponds to '30,000 won', and since the current time point accumulated used electricity value corresponds to '9,000 won', the electricity proportion value is calculated as '30%'. Accordingly, when the reference difference value is set to 5%, according to the example shown in FIG. 8, since the section proportion value (33%) is greater than the electricity proportion value (30%) by 3%, the management mode may eventually be determined as the 'primary management mode'. More specifically, the 'primary management mode' indicates that the current accumulated used electricity has been managed by average to a similar state as compared to the remaining sections, which remain for the usage of the electricity, and, therefore, if the instantaneously used electricity value temporarily exceeds the instantaneous electricity reference value (THI), this indicates that the current time point requires electricity management for managing such temporary excess.

Figure 4:
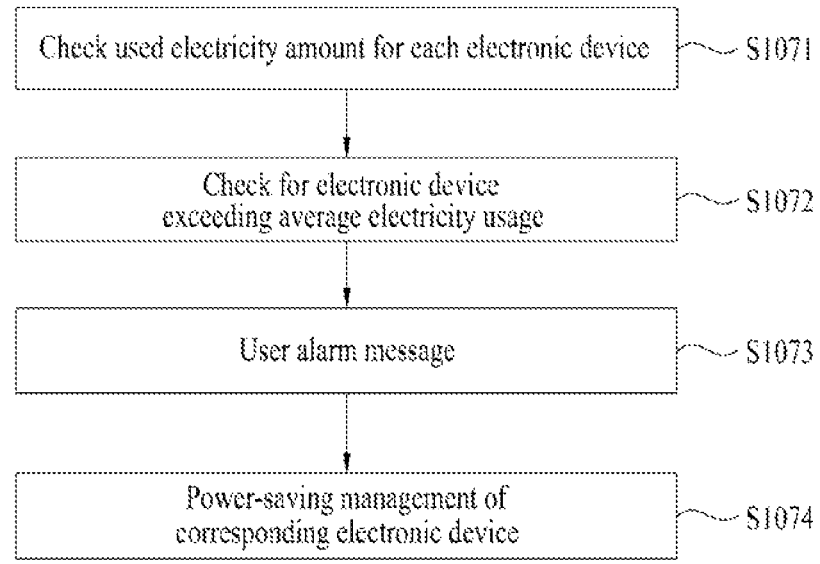

Respectively, FIG. 4 illustrates an exemplary management flow chart in the primary management mode. In performing the primary management mode, the control unit (105) checks the used electricity amount of all electronic devices that are connected to the internal network (20) (S1071) and also checks for any electronic device exceeding the average electricity usage (S1072). Thereafter, by using the display unit (106) and/or a display means within the corresponding electronic device that exceeds the average electricity usage, the control unit (105) may provide a user alarm message notifying that power saving management is being executed on the corresponding electronic device (S1073). Subsequently, the power saving management respective to the corresponding electronic device is performed (S1074). The process step S1074 may be applied by using different methods to best fit the characteristics of each of the corresponding electronic devices. For example, when the TV (24) corresponds to the electronic device that requires power-saving management, then, by adjusting the brightness of the TV screen and/or the size of the viewing screen, power saving may be induced. If the respective electronic device corresponds to the washing machine (25), the washing process may be shifted to the power-saving mode. Most particularly, the power-saving management may be decided based upon the electricity fee of the current time period. Additionally, although FIG. 4 shows an example of performing power-saving management only on electronic devices that exceed the average electricity, as another example, a method of performing collective power-saving management respective to all of the electronic devices within the internal network (20) may also be performed.

Figure 9:
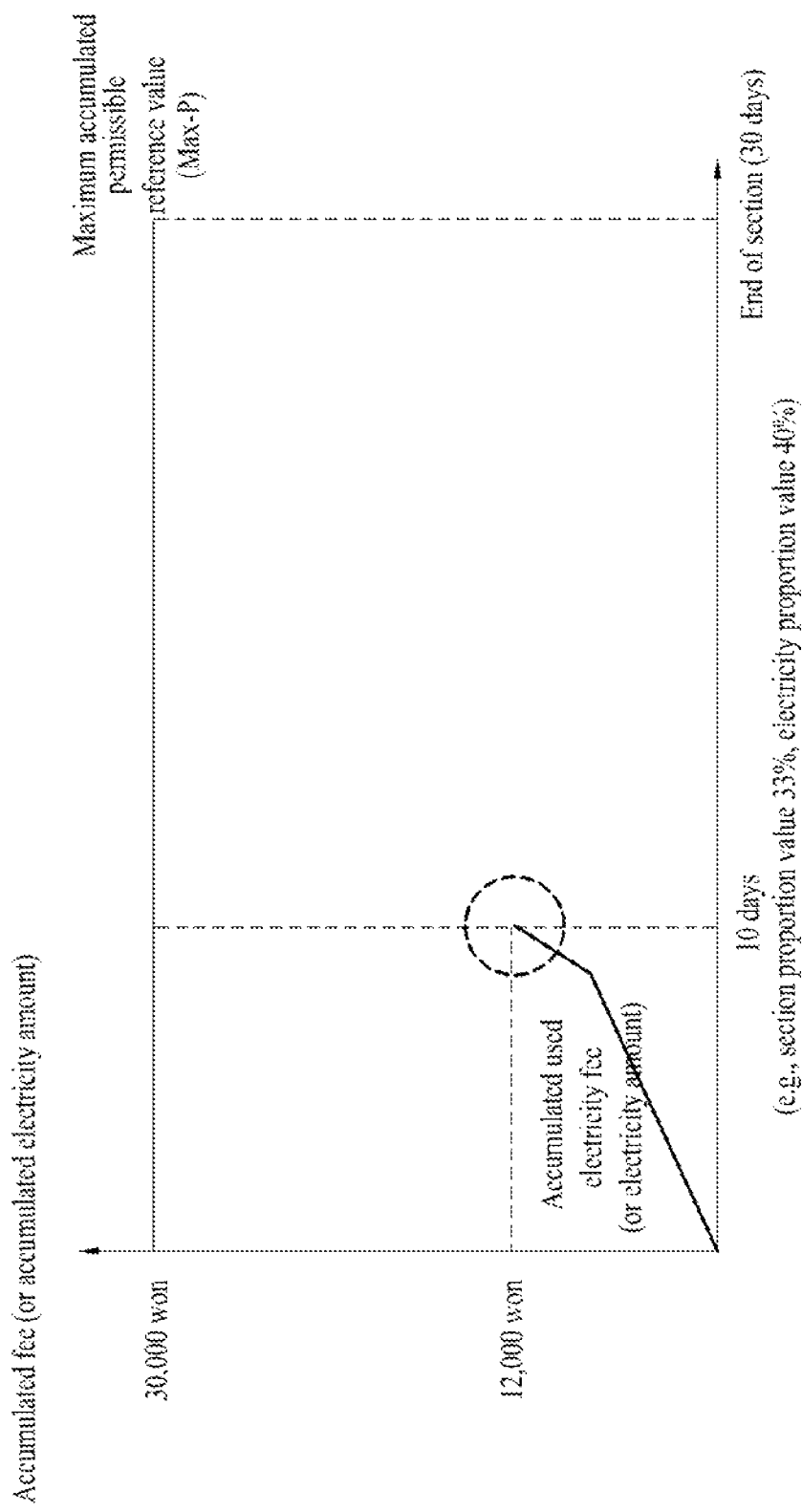

Moreover, the secondary management mode (S108) is executed when the electricity proportion value is within a range of exceeding the reference difference value (e.g., predetermined as 1%, 3%, or 5%) range. Respectively, FIG. 9 illustrates an exemplary graph showing the section proportion value and the electricity proportion value corresponding to the secondary management mode. According to FIG. 9, since the overall section is set to '30 days', and since the current time point corresponds to the first '10 days' of the overall section, the section proportion value corresponds to approximately '33%'. Additionally, since the maximum permissible electricity reference value (Max-P) corresponds to '30,000 won', and since the current time point accumulated used electricity value corresponds to '12,000 won', the electricity proportion value is calculated as '40%'. Accordingly, when the reference difference value is set to 5%, according to the example shown in FIG. 9, since the electricity proportion value (40%) exceeds the section proportion value (33%) by 7%, thereby exceeding the section proportion value by more than the reference difference value (e.g., 5%), the management mode may eventually be determined as the 'secondary management mode'. More specifically, the 'secondary management mode' indicates that the current accumulated used electricity is in an excessively used state as compared to the remaining sections, which remain for the usage of the electricity, and, therefore, this indicates that the current time point corresponds to a time point that requires electricity management more intense than that the primary management mode for managing such temporary excess, and the more intense electricity management.

Figure 5:
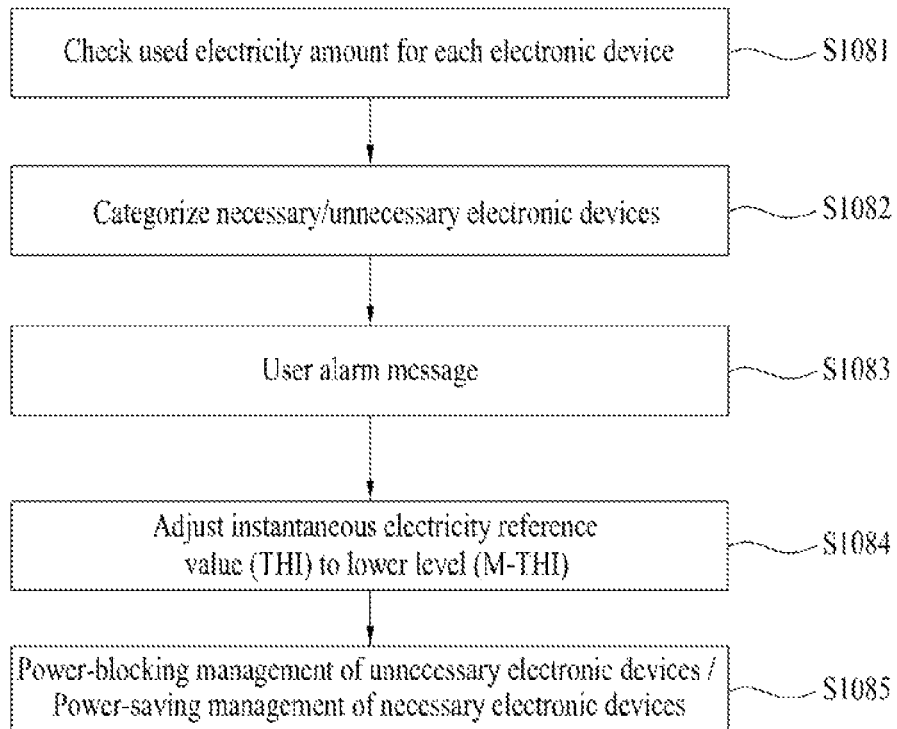

Respectively, FIG. 5 illustrates an exemplary management flow chart in the secondary management mode. In performing the secondary management mode, the control unit (105) checks the used electricity amount of all electronic devices that are connected to the internal network (20) (S1081), categorizes necessary electronic devices and unnecessary electronic devices (S1082), so as to perform power-saving management on the electronic devices that are categorized as the necessary electronic devices and to perform power-blocking management on the electronic devices that are categorized as the unnecessary electronic devices (S1085). Respectively, for example, the categorization on the necessary and unnecessary electronic devices may be categorized in advance by the user and set up, or More specifically, in performing the secondary management mode by the control unit (105), by using the display unit (106) and/or a display means within the corresponding electronic device on which the power-saving management or power-blocking management is to be executed, the control unit (105) may provide a user alarm message notifying a result of categorizing the electronic devices into necessary electronic devices and unnecessary electronic devices (S1083). Additionally, by referring to the user alarm message (1083), the user may be capable of verifying the type of the electronic devices that are categorized into necessary electronic devices and unnecessary electronic devices, thereby being capable of changing an electronic device, which is categorized as an unnecessary electronic device, to a necessary electronic device and changing an electronic device, which is categorized as a necessary electronic device, to an unnecessary electronic device.

Additionally, in performing the secondary management method, the control unit may further include a step of adjusting the predetermined instantaneous electricity reference value (THI) to a low level value (S1084). The adjusted instantaneous electricity reference value (M-THI) may be used later on in the management process, and this may allow a more enforced electricity management to be performed. More specifically, since a state of entering (or initiating) the secondary management mode indicates that the used amount of energy has exceeded the estimated amount within a short period of time, as an additional provision for such sudden excess, by adjusting the instantaneous electricity reference value (THI) to a low level value, the frequency rate of entering steps S107 and S108 after step S103 is increased, thereby further reinforcing the electricity management.

Furthermore, by adjusting reference difference value, the electricity management level may also be controlled. For example, when the predetermined reference difference value 5% is adjusted and changed to reference difference value 1%, in the example of FIG. 8, since the difference between the section proportion value (33%) and the electricity proportion value (30%) corresponds to 3%, the reference difference value 1% is exceeded, and therefore the management mode may be determined and changed from the 'primary management mode' to the 'normal management mode'. Additionally, for example, if the predetermined reference difference value 5% is adjusted and changed to reference difference value 12%, in the examples of FIG. 7, FIG. 8, and FIG. 9, since the respective difference between the section proportion value and the electricity proportion value is collectively within the range of 12% (e.g., FIG. 7—10%, FIG. 8—3%, FIG. 9—10%), in all cases, the management mode may be determined as the 'normal mode'. More specifically, when initially determining the reference difference value, or by adjusting and changing the reference difference value in a later process, the electricity control process may also be adjusted.

Figure 10:
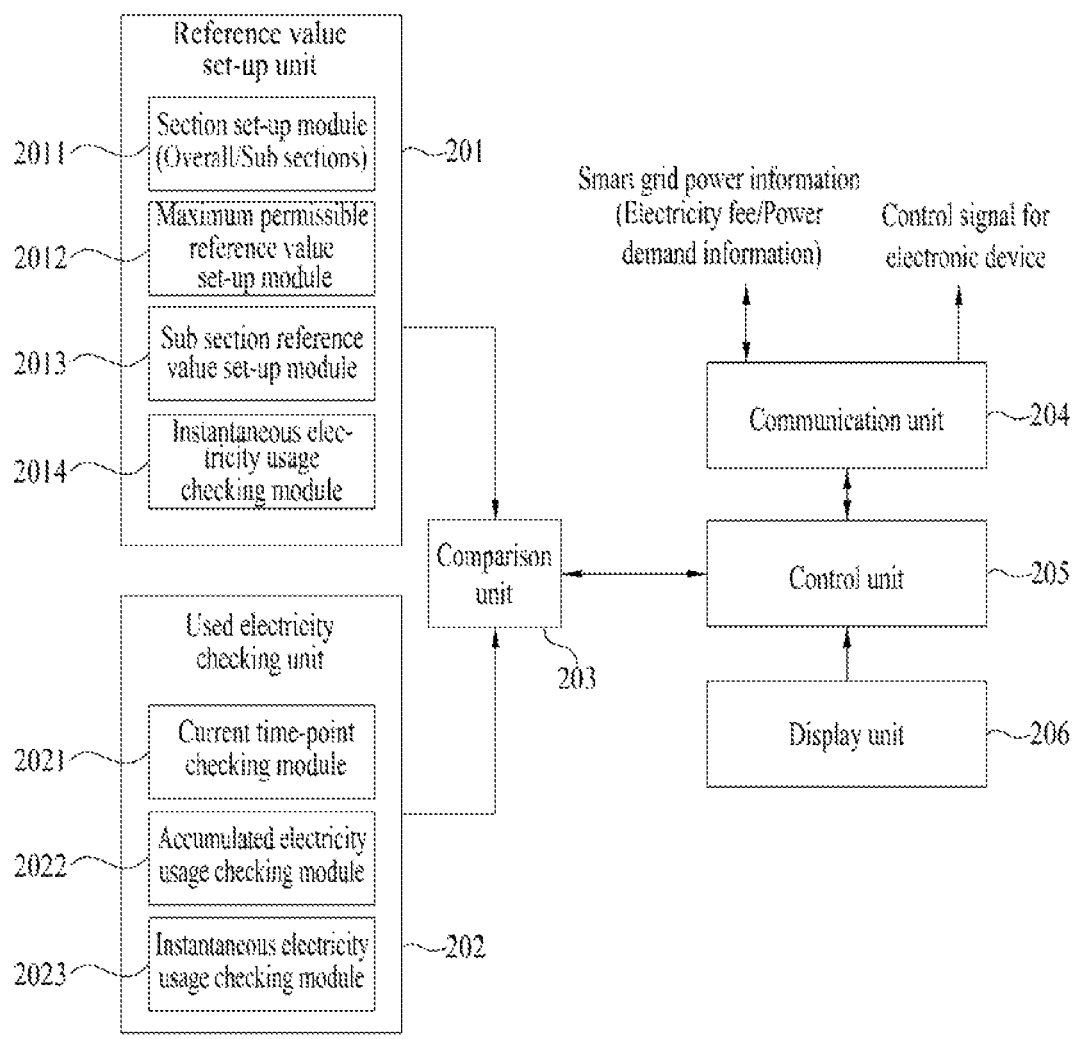
FIG. 10 illustrates an exemplary structure of an electricity management (or power control) apparatus according to another exemplary embodiment of the present invention.
Figure 11:
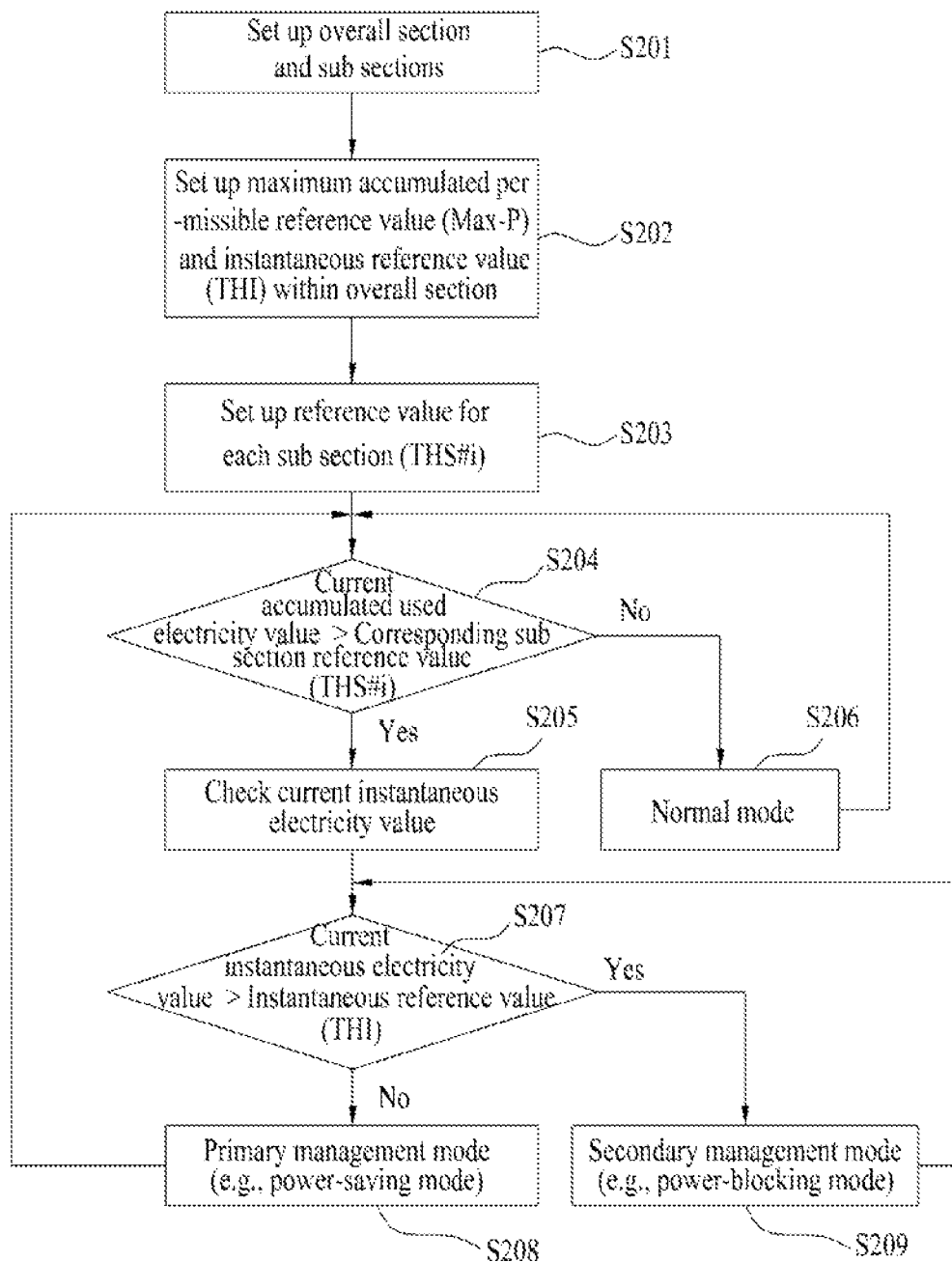
FIG. 11~FIG. 13 respectively illustrate flow charts of an electricity management (or power control) method according to the other exemplary embodiment of the present invention.
Figure 12:
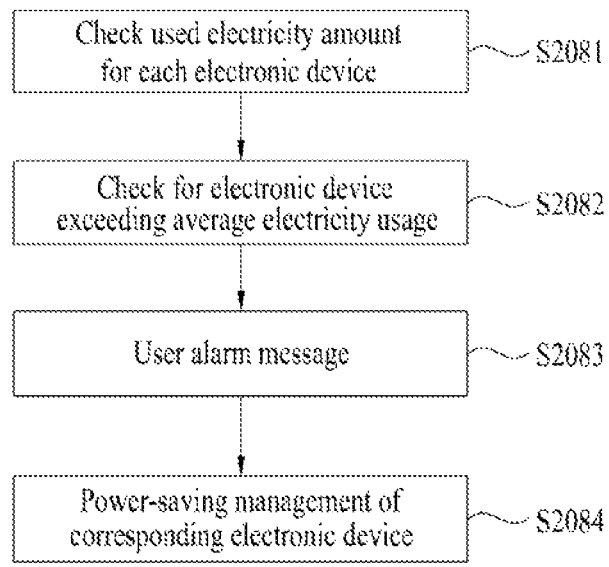
Figure 13:
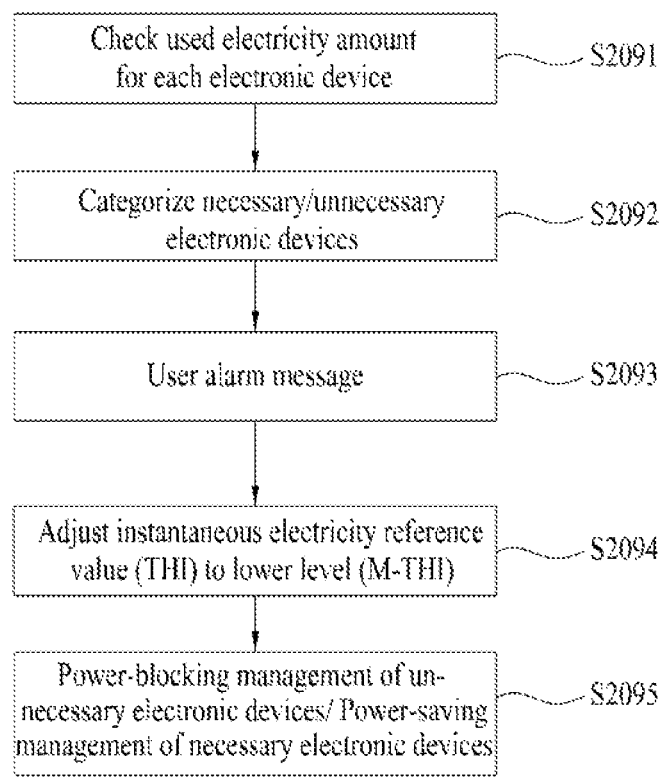

FIG. 10 illustrates an exemplary structure of an electricity management (or power control) apparatus according to a second exemplary embodiment of the present invention. Respectively, when comparing the second exemplary embodiment shown in FIG. 10 with the first exemplary embodiment shown in FIG. 2, the difference between the two exemplary embodiments is that, in the second embodiment, the overall section is first divided into sub sections, and the current accumulated used electricity value is compared with the permissible reference value for each sub section, and, then, by comparing the instantaneously used electricity value with the instantaneous electricity reference value, the electricity management mode is decided based upon the compared result. The electricity management apparatus according to the second exemplary embodiment of the present invention includes, for example, a reference value set-up unit (201), a used electricity checking unit (202), a comparison unit (203), a communication unit (204), a control unit (205), and a display unit (206). However, the structure is shown in blocks for each function for simplicity in the description, and in the actual implementation, the electricity management apparatus may be configured as a single structure or may be implemented as a software program. Additionally, in the specific exemplary embodiment of the present invention, it will be apparent that part of the elements of the electricity management apparatus may correspond to supplementary elements and not the essential elements of the electricity management apparatus.

The communication unit (204) is connected to the above-described smart grid electricity information network (10), thereby being capable of performing two-way communication, such as receiving electricity information or transmitting the related information. Additionally, the communication unit (204) is connected to the internal network (20), thereby being capable of performing two-way communication with the electronic devices (22~26) accessing and existing within the internal network (20). Most particularly, the communication unit (204) performs the function of transmitting electricity (or power) control signals respective to a control (or management) process of the control unit (205) included in the electricity management apparatus to each of the electronic devices (22~26). Therefore, although the communication unit (204) is illustrated as a single functional block for simplicity in the description of the present invention, as described above, it shall be appropriate to understand the communication unit (204) as a group unit of diverse communication modules (e.g., modules capable of performing wired, wireless, close-range communication) performing multiple communication functions.

The reference value set-up unit (201) sets up a reference value for electricity management and stores the set reference value. The reference value set-up unit (201) includes a section set-up module (2011) setting up a specific section as an overall section and dividing the predetermined overall section into a plurality of sub sections, a maximum permissible reference value set-up module (2012) setting up a maximum reference value that is permitted (or allowed) due to an accumulation within the set total (or overall) section, a sub section reference value set-up module (2013) setting up a reference value for each sub section, which is permissible due to an accumulation of each of the predetermined sub section, and an instantaneous electricity reference value set-up module (2014) setting up an instantaneous electricity reference value that is permitted within the set total (or overall) section. Respectively, the reference values may be decided based upon (or with reference to) at least any one of an electricity fee or amount of electricity. For example, when the reference value is decided based upon the electricity fee, the maximum permissible reference value and the instantaneous reference value may be respectively replaced with a 'maximum permissible electricity fee' and an 'instantaneously used electricity fee'. Conversely, when the reference value is decided based upon the electricity amount, the maximum permissible reference value and the instantaneous reference value may be respectively replaced with a 'maximum permissible reference electricity amount' and an 'instantaneous reference electricity amount'.

Additionally, the used electricity checking unit (202) performs the function of verifying the electricity usage state of the electronic devices (e.g., FIG. 1 22~26) within the current internal network (20). The used electricity checking unit (202) includes a current time-point checking module (2021) checking a current time point within the set up total (or overall) section and sub sections, an accumulated electricity usage checking module (2022) checking the accumulated electricity usage value up to the current time point, and an instantaneous electricity usage checking module (2023) checking an instantaneous electricity value at the current time point.

Moreover, the comparison unit (203) performs a comparison process between each set of information within the above-described reference value set-up unit (201) and used electricity checking unit (202), in accordance with the control of the control unit (205). The compared result is transmitted to the control unit (205).

In addition to controlling the overall elements within the electricity management apparatus, the control unit (205) receives the compared result from the comparison unit (203) and decides a 'management mode' for each electronic device within the internal network (20) and then generates respective electricity management signals, thereby performing control (or management) operations allowing the generated electricity management signals to be transmitted through the communication unit (204). Respectively, the management mode that is decided by the control unit (205) may, for example, consist of a normal mode, a primary management mode (e.g., power saving mode), and a secondary management mode (e.g., power blocking mode), and these will be described later on in more detail.

The display unit (206) may be configured on a circumference of the electricity management apparatus as a means that can be audibly and/or visually recognized by the user. The electricity management apparatus is thus capable of providing diverse information to the user through the display unit (206), and, most particularly, in accordance with the control process of the control unit (205), the electricity management apparatus is also capable of providing a 'user alarm message' best-fitting the above-described management mode to the user.

Hereinafter, the electricity management method according to the second exemplary embodiment of the present invention will hereinafter be described in detail with reference to FIG. 11~FIG. 17.

Figure 14:
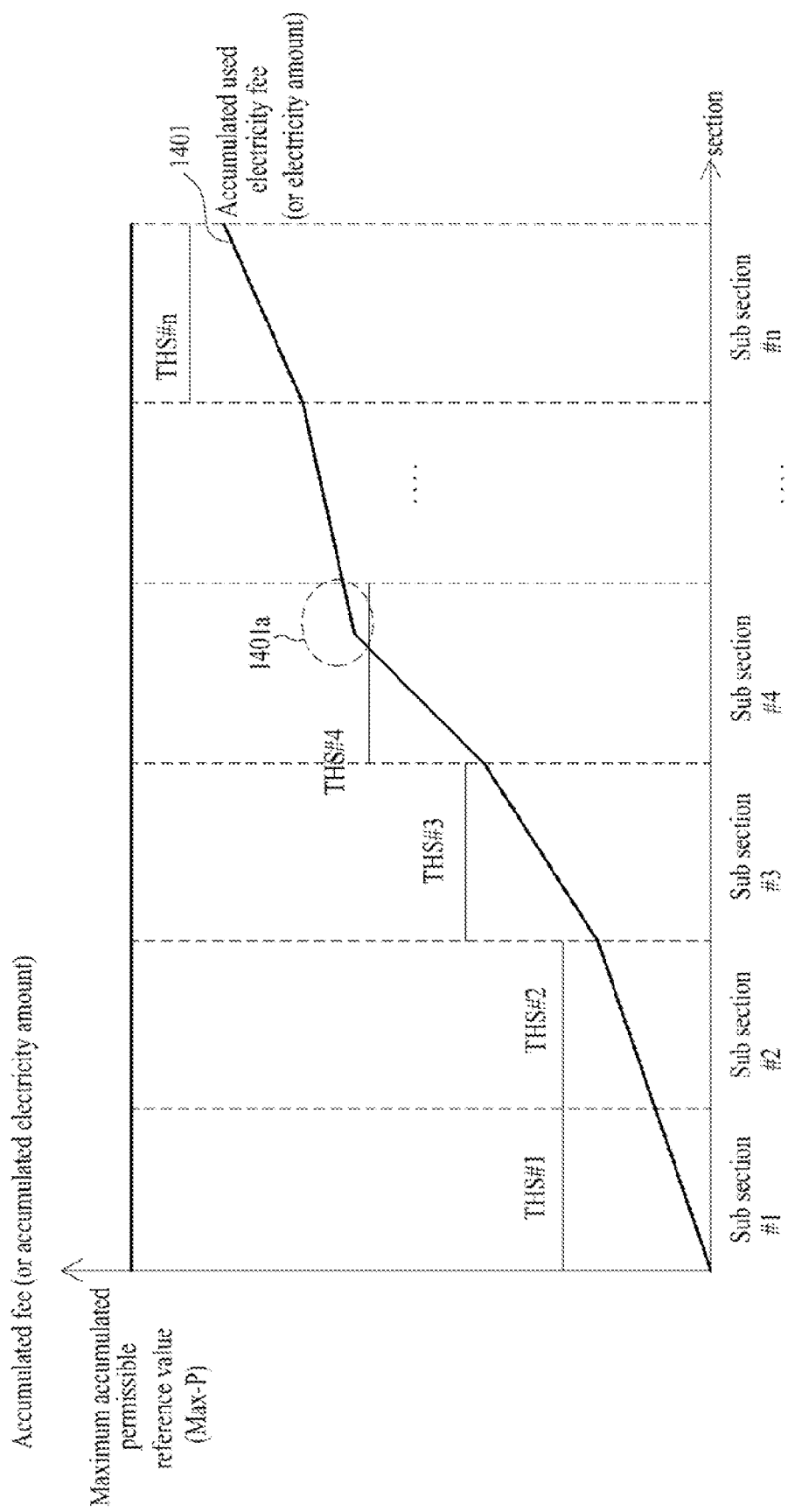
FIG. 14~FIG. 17 respectively illustrate electricity usage graphs for describing the electricity management (or power control) method according to the other exemplary embodiment of the present invention.
Figure 15:
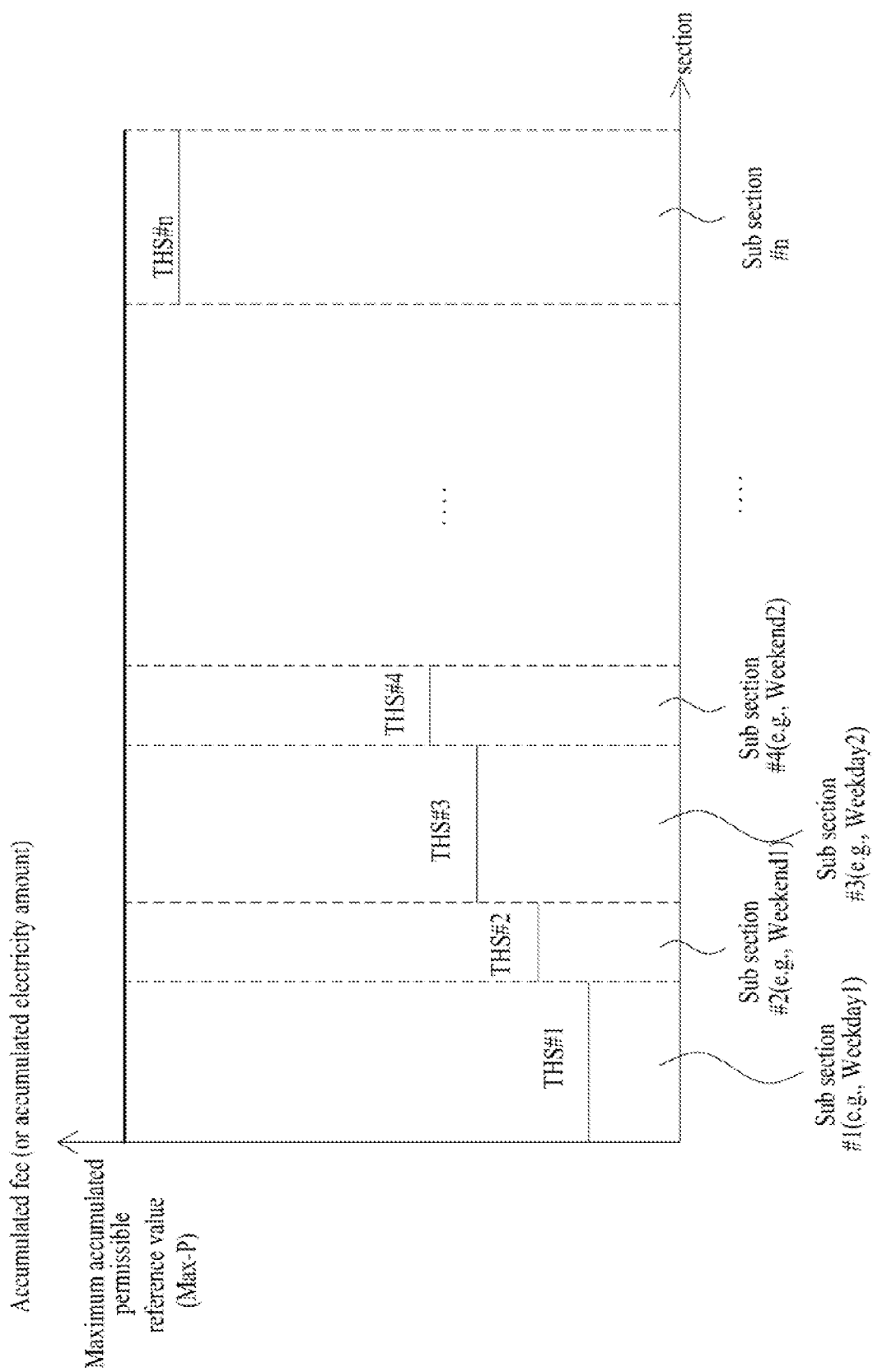
Figure 16:
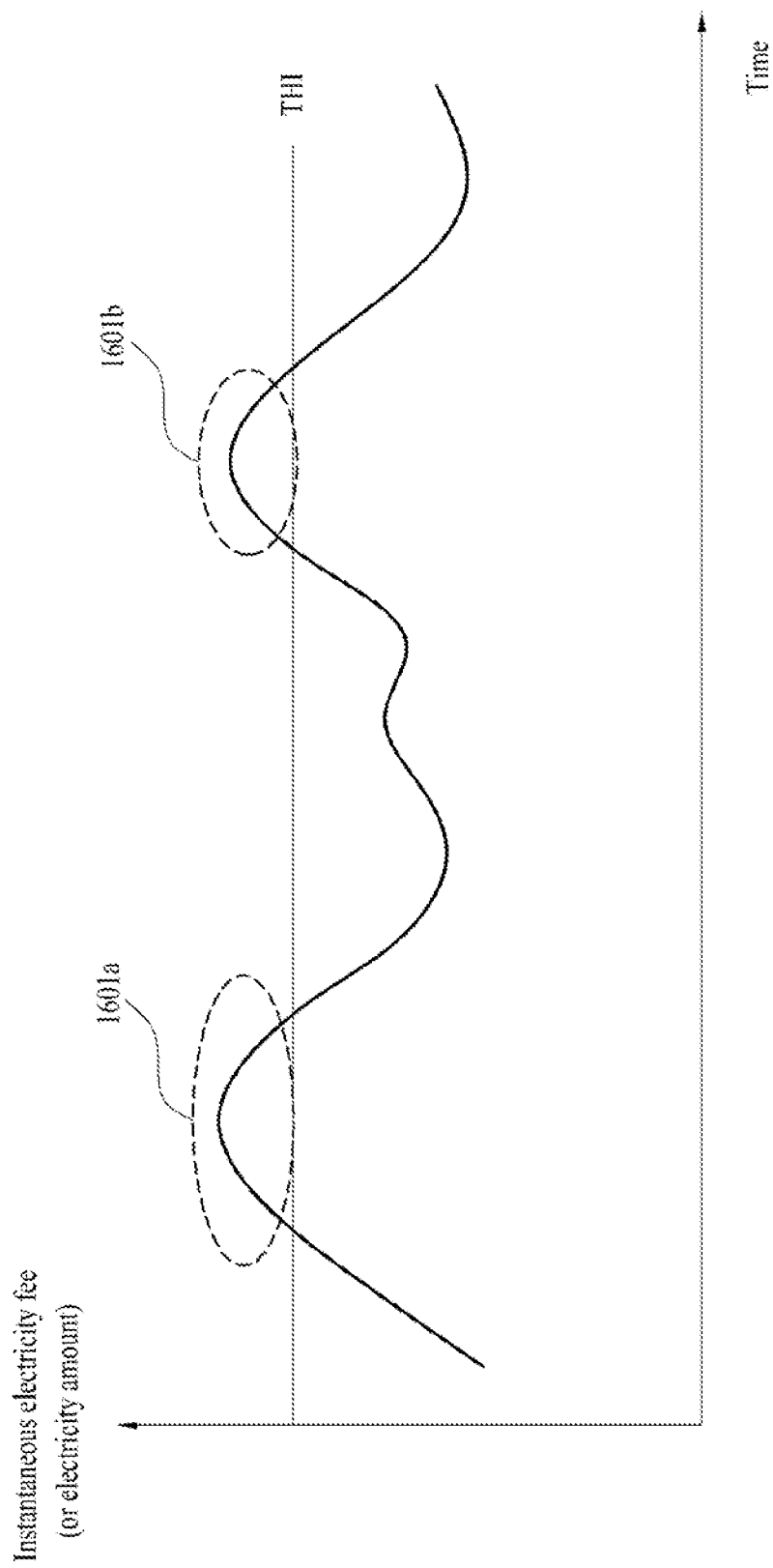
Figure 17:
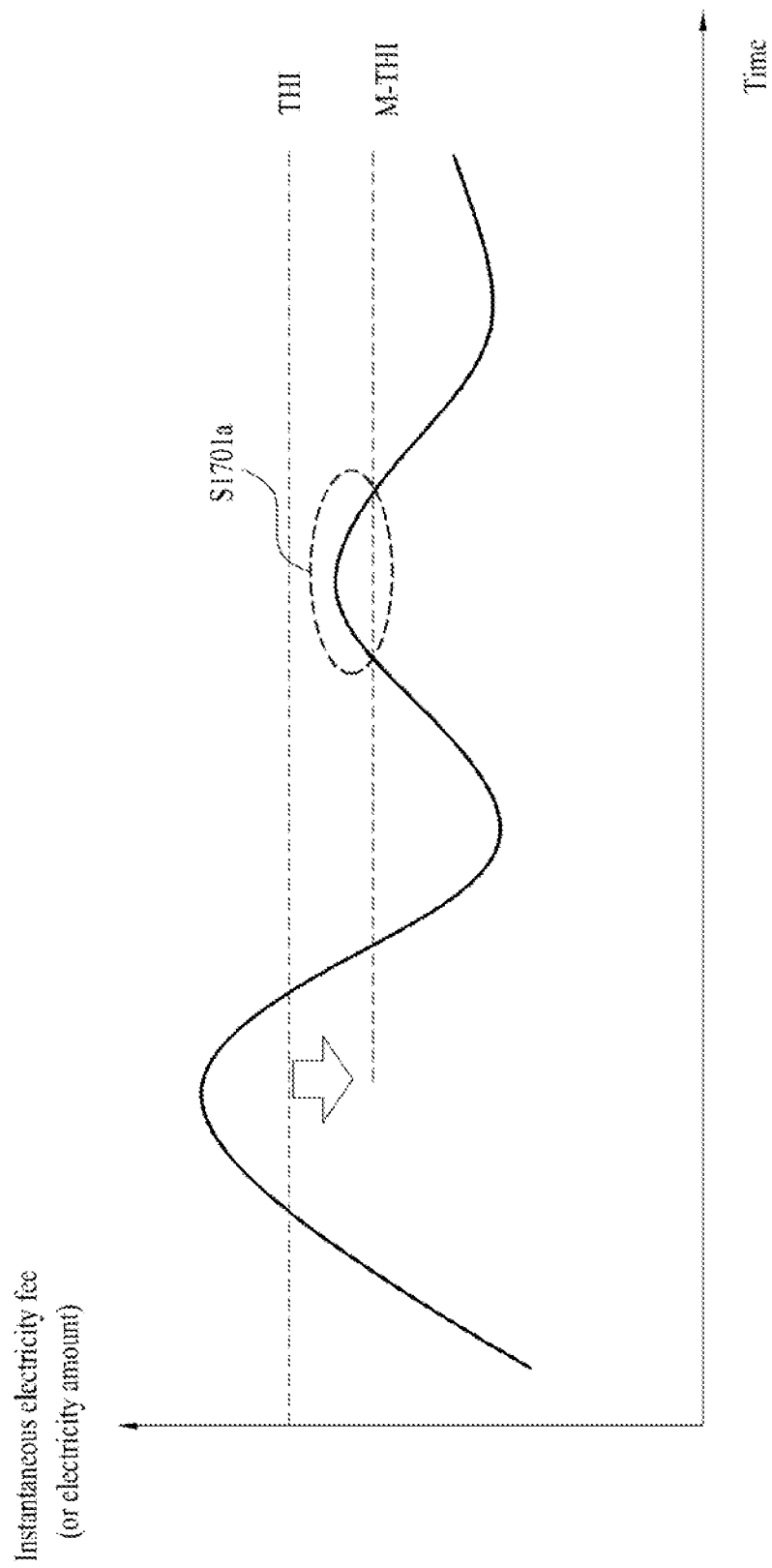

First of all, due to the user or system, a specific section within the above-described reference value set-up unit (101) is set up (or determined) as the overall section, or multiple sub sections dividing the overall section may be set up (S201). Respectively, for example, the overall section may be set up in monthly units or weekly units, and the sub section may divide the predetermined overall section into equal sizes or non-equal sizes. For example, FIG. 14 shows an exemplary case of setting up n number of sub sections within the overall section, each sub section having the same size. Additionally, for example, when setting up the overall section in monthly units, in setting up n number of sub sections, FIG. 15 shows an exemplary case of setting up each sub section to have different sizes. For example, FIG. 15 illustrates a case of dividing and setting up the monthly-unit sub sections into weekdays and weekends. More specifically, the setting up of the sub section may be arbitrarily performed by the user or system to best fit the user's life style.

Additionally, a maximum permissible electricity reference value (Max-P) that is permitted (or allowed) due to an accumulated usage and an instantaneous electricity reference value (THI) is set up within the set overall section (S202). For example, the reference value may be set up based upon the electricity fee or electricity amount. Therefore, more specifically, for example, in an overall section, '30,000 won' (i.e., maximum permissible electricity fee) may be set as the maximum permissible electricity reference value (Max-P), and '500 won' (i.e., instantaneous electricity fee) may be set as the instantaneous electricity reference value (THI). Alternatively, for example, in the monthly-unit overall section, '30,000 won' (i.e., maximum permissible electricity fee) may be set as the maximum permissible electricity reference value (Max-P), and '10 Kwh' (i.e., instantaneous electricity amount) may be set as the instantaneous electricity reference value (THI). Additionally, when the user sets up the overall section and the maximum permissible electricity reference value (Max-P), the system (e.g., control unit (205)) may be capable of setting up the instantaneous electricity reference value (THI) in a later process based upon the set overall section and maximum permissible electricity reference value (Max-P).

Furthermore, a sub section reference value (THS#i) is set up for each of the predetermined sub section (S203). The sub section reference value (THS#i) may be set up with the maximum permissible accumulated electricity value for each sub section, or a value corresponding to a predetermined ratio (e.g., 90%) of the maximum permissible accumulated electricity value for each sub section may be set up as the sub section reference value (THS#i). More specifically, although it will be described later on in more detail, the type of management mode may be different depending upon the set up size of the sub section reference value (THS#i), and, most particularly, when the sub section reference value (THS#i) is set up to have a low level, the electricity management may be more easily performed. However, instead of seeking to perform unconditional power-saving management, since the present invention seeks to perform an efficient electricity management within the predetermined maximum permissible electricity reference value (Max-P), it will be required to decide, by experience or in numbers, a most optimal sub section reference value (THS#i) best-fitting the circumstance of each internal network (20). Additionally, as described above, the sub section reference value (THS#i) may be set up based upon the electricity fee or electricity amount.

Thereafter, the control unit (205) checks the accumulated used electricity value used by the electronic devices within the internal network (20) at the current time period by using the accumulated used electricity checking module (2022), and, then, the control unit (205) compares the checked value with the sub section reference value (THS#i) (S204).

Based upon the compared result, if the accumulated used electricity value does not exceed the corresponding sub section reference value (THS#i), the electricity management is performed in the normal mode (S206). For example, referring to FIG. 14, during sub section #1~sub section #3, and sub section #n, since the accumulated used electricity value (1401) does not exceed each sub section reference value (THI#1, THI#2, THI#3, THI#n), during the same section period, the electricity management is performed in the normal mode of step S206. Respectively, the normal mode refers to maintaining the current electricity management method as it is and also refers to not performing additional electricity management on each of the electronic devices.

Additionally, based upon the compared result, if the accumulated used electricity value exceeds the corresponding sub section reference value (THS#i), the electricity management mode is decided based upon an instantaneously used electricity value in a later process. Respectively, referring to FIG. 14, for example, a time point (1401a) wherein the accumulated used electricity value (1401) exceeds the corresponding sub section reference value (THS#4) occurs within the section of the sub section #4, and the following operations are performed subsequently at the same time point (1401a).

For example, when the time period such as 1401a of FIG. 14 occurs, the control unit (205) checks the instantaneously used electricity value used by the electronic devices within the internal network (20) at the current time period by using the instantaneously used electricity checking mode (2023) within the above-described used electricity checking unit (202) (S205), and, then, the control unit (205) compares the instantaneously used electricity value at the verified current time point with the predetermined instantaneous electricity reference value (THI) (S207). Based upon the compared result, if the current instantaneously used electricity value is smaller than the predetermined instantaneous electricity reference value (THI), the control unit (205) performs the 'primary management mode' (S208), and, if the current instantaneously used electricity value exceeds the predetermined instantaneous electricity reference value (THI)(1601a, 1601b), the control unit (205) performs the 'secondary management mode' (S209). Respectively, the detailed operations of the 'primary management mode' (S208) are performed by each of steps S2081, S2082, S2083, and S2084 of FIG. 12, and since the meaning of each of the corresponding steps is identical to each of steps S1071, S1072, S1073, and S1074 of FIG. 4, the detailed description of the same will be omitted for simplicity. Additionally, the detailed operations of the 'secondary management mode' (S209) are performed by each of steps S2091, S2092, S2093, and S2094 of FIG. 13, and since the meaning of each of the corresponding steps is identical to each of steps S1081, S1082, S1083, S0184, and S1085 of FIG. 5, the detailed description of the same will be omitted for simplicity. However, with respect to step S2094, the initially set instantaneous electricity reference value (THI) may be adjusted to a low level instantaneous electricity reference value (M-THI). Respectively, for example, in FIG. 17, as the instantaneously used electricity value of a specific time point (1701a) is smaller than the initial instantaneous electricity reference value (THI) yet greater than the adjusted instantaneous electricity reference value (M-THI), this may indicate that the secondary management mode (S209) is performed instead of the primary management mode (S208). This signifies that, when it is determined that a more reinforced electricity management method is required to be performed, the control unit (205) may arbitrarily decide and perform the corresponding management mode.

Figure 18:
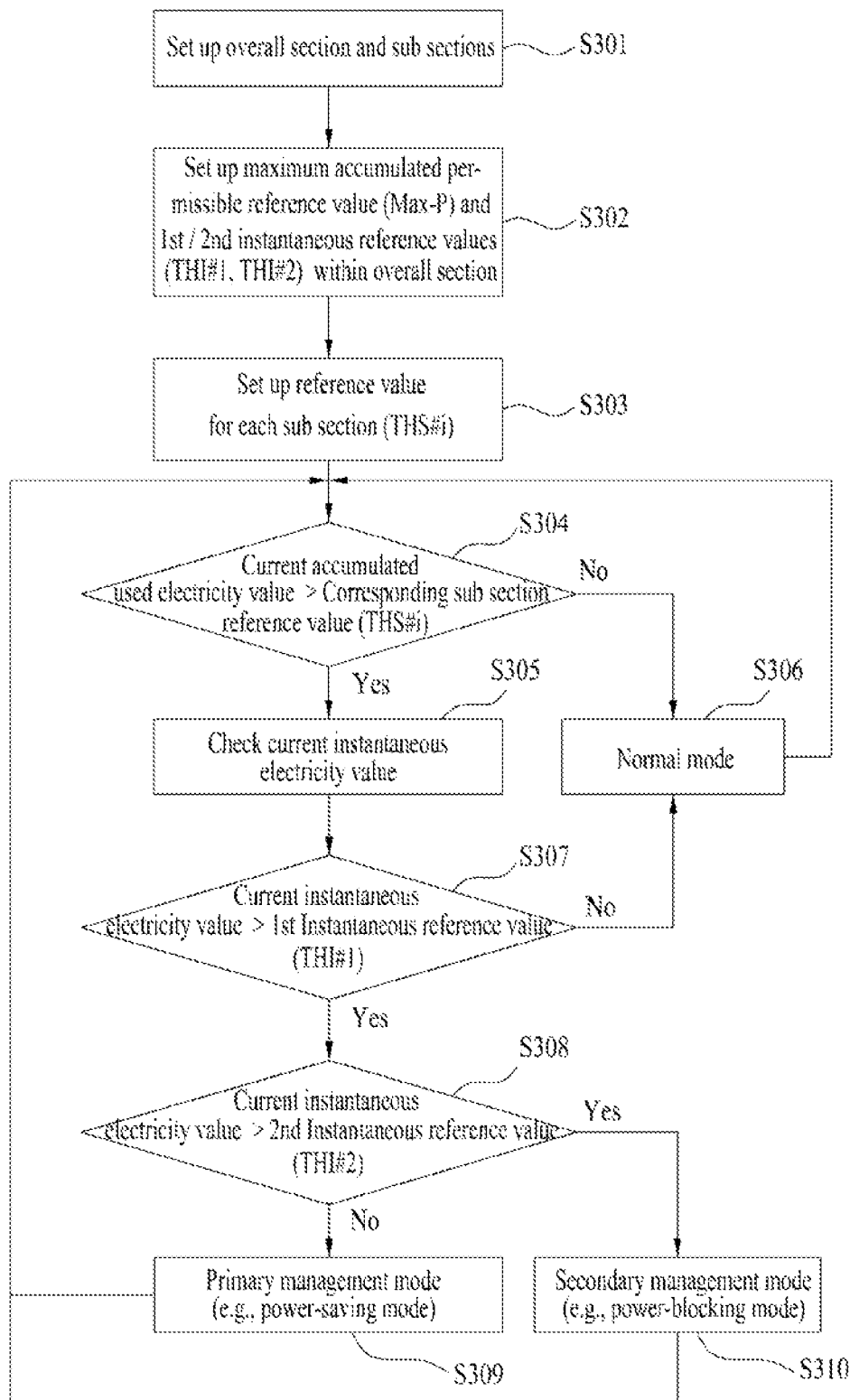
FIG. 18~FIG. 20 respectively illustrate flow charts of an electricity management (or power control) method according to yet another exemplary embodiment of the present invention.
Figure 19:
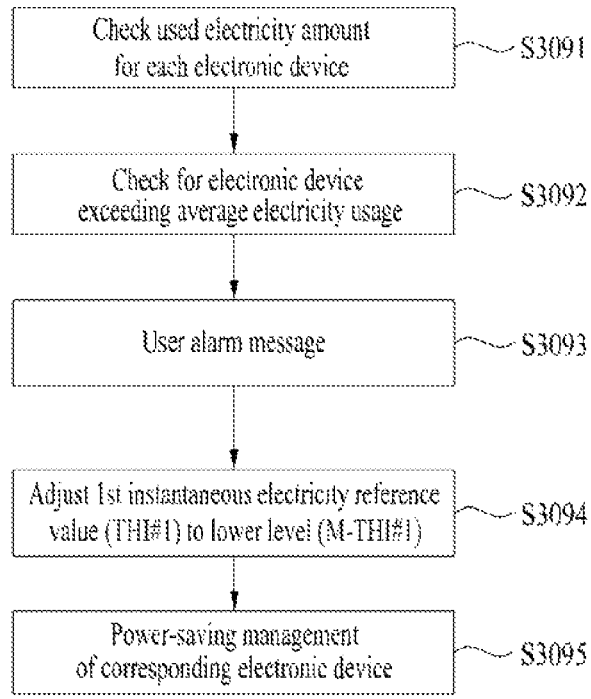
Figure 20:
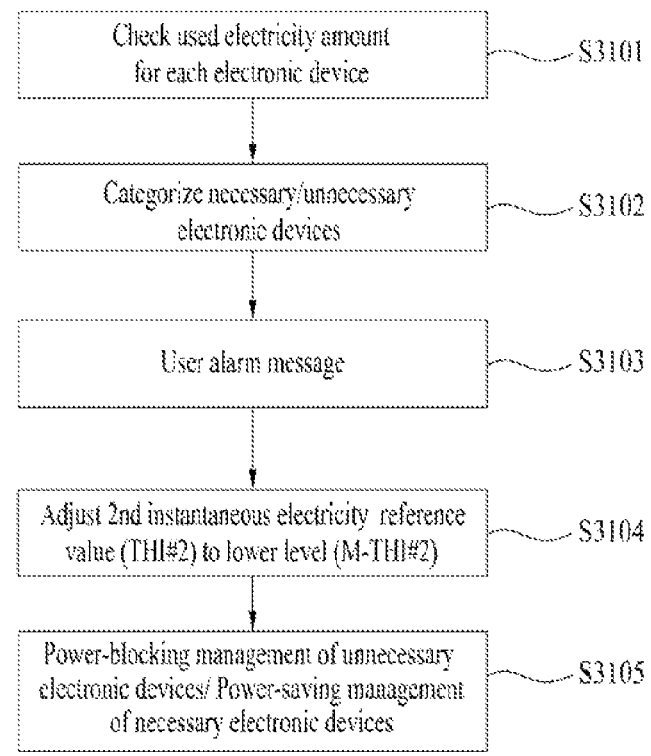

FIG. 18~FIG. 20 respectively illustrate flow charts of an electricity management (or power control) method according to yet another exemplary embodiment of the present invention. When compared with the second exemplary embodiment of the present invention of FIG. 10~FIG. 17, the third exemplary embodiment of the present invention sets up multiple instantaneous electricity reference values (e.g., TH#1, TH#2), and this is considered when deciding the electricity management mode.

Hereinafter, referring to FIG. 18~FIG. 20, the electricity management method according to the third exemplary embodiment of the present invention will hereinafter be described as follows. First of all, a specific section within the above-described reference value set-up unit (201) is set up as the overall section or the specific section is set as sub sections having the overall section divided into a plurality of sub sections by the user or system (S301).

Additionally, within the predetermined overall section, a maximum permissible electricity reference value (Max-P), which is permitted due to an accumulated usage, and at least two or more instantaneous reference values, e.g., a first instantaneous reference value (THI#1) and a second instantaneous reference value (THI#2) are set (S302). Respectively, the first instantaneous reference value (THI#1) may be set to be smaller than the second instantaneous reference value (THI#2), and, in accordance with the management level, the difference between the first instantaneous reference value (THI#1) and the second instantaneous reference value (THI#2) may be adjusted. This will be described later on in more detail.

Moreover, a sub section reference value (THS#i) for each of the predetermined sub sections is set (S303). The sub section reference value (THS#i) may be set up with the maximum permissible accumulated electricity value for each sub section, or a value corresponding to a predetermined ratio (e.g., 90%) of the maximum permissible accumulated electricity value for each sub section may be set up as the sub section reference value (THS#i).

Thereafter, the control unit (205) checks the accumulated used electricity value used by the electronic devices within the internal network (20) at the current time period by using the accumulated used electricity checking module (2022), and, then, the control unit (205) compares the checked value with the sub section reference value (THS#i) (S304). Based upon the compared result, if the accumulated used electricity value does not exceed the corresponding sub section reference value (THS#i), the electricity management is performed in the normal mode (S306). Respectively, the normal mode refers to maintaining the current electricity management method as it is and also refers to not performing additional electricity management on each of the electronic devices.

Additionally, based upon the compared result, if the accumulated used electricity value exceeds the corresponding sub section reference value (THS#i), the control unit (205) checks the instantaneously used electricity value used by the electronic devices within the internal network (20) at the current time period by using the instantaneously used electricity checking mode (2023) within the above-described used electricity checking unit (202) (S305), and, then, the control unit (205) compares the instantaneously used electricity value at the verified current time point with the predetermined low level first instantaneous electricity reference value (THI#1) (S307).

Based upon the compared result, when the current instantaneously used electricity value is smaller than the predetermined first instantaneous electricity reference value (THI#1), the control unit (205) performs the above-described normal mode (S306). And, based upon the compared result, if the current instantaneously used electricity value is greater than the predetermined first instantaneous electricity reference value (THI#1), the control unit (205) compares the instantaneously used electricity value with the predetermined high level second instantaneous electricity reference value (THI#2) (S308).

Thereafter, based upon the compared result, when the current instantaneously used electricity value is smaller than the predetermined second instantaneous electricity reference value (THI#2), the control unit (205) performs the 'primary management mode' (S309), and when the current instantaneously used electricity value exceeds the predetermined second instantaneous electricity reference value (THI#2), the control unit (205) performs the 'secondary management mode' (S310). Respectively, the detailed operations of the 'primary management mode' (S309) are performed by each of steps S3091, S3092, S3093, S3094, and S3095 of FIG. 19, and, most particularly, since each of steps S3091, S3092, S3093, and S3095 is respectively identical to each of steps S1071, S1072, S1073, and S1074 of FIG. 4, the detailed description of the same will be omitted for simplicity. However, in step S3094, when the initially set first instantaneous electricity reference value (THI#1) is greater than a lower level instantaneous electricity reference value (M-THI#1), this may indicate that the primary management mode (S309) is performed instead of the normal mode (S306). This signifies that, when it is determined that a more reinforced electricity management method is required to be performed, the control unit (205) may arbitrarily decide and perform the corresponding management mode.

Additionally, the detailed operations of the 'secondary management mode' (S209) are performed by each of steps S3101, S3102, S3103, S3104, and S3105 of FIG. 20, and since the meaning of each of the corresponding steps is identical to each of steps S1081, S1082, S1083, S0184, and S1085 of FIG. 5, the detailed description of the same will be omitted for simplicity. However, with respect to step S3104, the initially set second instantaneous electricity reference value (THI#2) may be adjusted to a lower level second instantaneous electricity reference value (M-THI#2). However, in this case, the adjusted second instantaneous electricity reference value (M-THI#2) should have a greater value than the adjusted first instantaneous electricity reference value (M-THI#1). More specifically, for example, when the instantaneously used electricity value of a specific time point is smaller than the initial second instantaneous electricity reference value (THI#2) yet greater than the adjusted second instantaneous electricity reference value (M-THI#2), this may indicate that the control unit (205) performs the secondary management mode (S310) instead of the primary management mode (S309). Eventually, this signifies that, when it is determined that a more reinforced electricity management method is required to be performed, the control unit (205) may arbitrarily decide and perform the first instantaneous electricity reference value (M-THI#1) and the second instantaneous electricity reference value (M-THI#2), by performing steps S3094 and S3095.

Mode for Carrying Out the Present Invention

The electricity management method that is applied in the present invention may be designed as a program that can be executed in a computer and may be stored in a recording medium that can be read by the computer. The recording medium that can be read by the computer includes all types of storage devices in which data that can be read by a computer system are stored. Examples of the recording medium that can be read by the computer may include ROM, RAM, CD-ROM, electromagnetic tape, floppy disks, optical data storage device, and so on, and may also include recording medium that can be realized in the form of a carrier wave (e.g., transmission via internet). Additionally, bit streams that are generated by the electricity management method having the present invention applied therein may be stored in the storage medium that can be read by the computer or may be transmitted by using a wired/wireless communication network.

INDUSTRIAL APPLICABILITY

The present invention may be applied to an electricity management apparatus and an electricity management method that require an efficient electricity management. Although the present invention has been described based upon limited exemplary embodiments and drawings, the present invention will not be limited only to the embodiments set forth herein, and, therefore, it will be apparent to those skilled in the art that various modifications and variations can be made in the present invention without departing from the spirit or scope of the inventions provided they come within the scope of the appended claims and their equivalents.

What is claimed is:

1. An electricity management apparatus, comprising:
a communication unit receiving electricity information through a smart grid electricity information network, or transmitting electricity management information respective to an electronic device being connected to a network through an internal network;
a reference value set-up unit setting up an overall section, and setting up a maximum permissible electricity reference value and instantaneous electricity reference value respective to the set overall section; and a control unit deciding a management mode for each electronic device being connected to the internal network, when a current instantaneously used electricity value exceeds the set instantaneous electricity reference value, based upon an electricity proportion value comparing a current accumulated used electricity value with respect to the set maximum permissible electricity reference value, and based upon a section proportion value comparing a current time point of the specific section, and performing managing operations, so as to transmit electricity management information respective to the decided management mode.

2. The apparatus of claim 1, wherein the maximum permissible electricity reference value and instantaneous electricity reference value are decided with reference to at least any one of an electricity fee and an electricity amount.

3. The apparatus of claim 1, wherein the maximum permissible electricity reference value is set up with any one of a maximum permissible electricity fee or electricity amount by the user during the specific section.

4. The apparatus of claim 3, wherein the instantaneous electricity reference value is set up by calculating an instantaneous electricity amount based upon the predetermined maximum permissible electricity reference value and the specific section period.

5. The apparatus of claim 1, wherein the management mode is divided into a normal mode, a primary management mode, and a secondary management mode, and wherein the normal mode is executed when the section proportion value is within a predetermined range of exceeding the electricity proportion value.

6. The apparatus of claim 1, wherein the management mode is divided into a normal mode, a primary management mode, and a secondary management mode, and wherein the primary management mode is executed when the section proportion value and the electricity proportion value are within the same range.

7. The apparatus of claim 6, wherein, in executing the primary management mode, the control unit checks the used electricity amount of each electronic device, and wherein the control unit performs power-saving management with respect to any electronic device exceeding an average electricity.

8. The apparatus of claim 7, wherein, in executing the primary management mode, the control unit uses a display means included in the electricity management apparatus and/or a display means included in the corresponding electronic device having the power-saving management performed therein, and wherein the control unit performs management operations, so as to provide a user alarm message notifying that the power-saving management is being performed.

9. The apparatus of claim 1, wherein the management mode is divided into a normal mode, a primary management mode, and a secondary management mode, and wherein the secondary management mode is executed when the electricity proportion value is within a predetermined range of exceeding the section proportion value.

10. The apparatus of claim 9, wherein, in executing the secondary management mode, the control unit checks the used electricity amount of each electronic device, and wherein the control unit categorizes the electronic devices to necessary electronics device and unnecessary electronic devices, so as to perform power-saving management with respect to the necessary electronic devices and to perform power-blocking management with respect to the unnecessary electronic devices.

11. The apparatus of claim 10, wherein, in executing the secondary management mode, the control unit further includes a step of adjusting the instantaneously used reference value to a low level value.

12. The apparatus of claim 10, wherein, in executing the secondary management mode, the control unit uses a display means included in the electricity management apparatus and/or a display means included in the corresponding electronic device having the power-saving management or power-blocking management performed therein, and wherein the control unit performs management operations, so as to provide a user alarm message notifying that the power-saving management is being performed.

13. An electricity management apparatus, comprising:

a communication unit receiving electricity information through a smart grid electricity information network, or transmitting electricity management information respective to an electronic device being connected to a network through an internal network;

a reference value set-up unit setting up a maximum permissible electricity reference value corresponding to a specific section, an electricity reference value for each sub section after dividing the specific section to a plurality of sub sections, and an instantaneous electricity reference value; and a control unit comparing an accumulated used electricity value at a time point corresponding to a specific sub section with a sub section electricity reference value being set up in the corresponding sub section, and comparing a current instantaneous electricity value with the set instantaneously used reference value, so as to decide a management mode for each electronic device being connected to the internal network, and performing control operations, so as to transmit electricity management information respective to the decided management mode.

14. The apparatus of claim 13, wherein the sub section is set up by dividing the overall section into equal sections having the same size.

15. The apparatus of claim 13, wherein the sub section is set up by dividing the overall section into non-equal sections having different sizes based upon characteristics of the overall section.

16. The apparatus of claim 13, wherein the management mode is divided into a normal mode, a primary management mode, and a secondary management mode, and wherein the normal mode is executed when the accumulated used electricity value at a time point corresponding to the specific sub section is within a range smaller than the sub section electricity reference value that is set up in the corresponding sub section.

17. The apparatus of claim 13, wherein the management mode is divided into a normal mode, a primary management mode, and a secondary management mode, and wherein the primary management mode is executed when the accumulated used electricity value at a time point corresponding to the specific sub section exceeds the sub section electricity reference value that is set up in the corresponding sub section and when a current instantaneous electricity value is within a range of not exceeding the set instantaneously used reference value, and wherein, in executing the primary management mode, the control unit checks the used electricity amount of each electronic device, and wherein the control unit performs power-saving management with respect to any electronic device exceeding an average electricity, and wherein, in executing the primary management mode, the control unit uses a display means included in the electricity management apparatus and/or a display means included in the corresponding electronic device having the power-saving management performed therein, and wherein the control unit performs management operations, so as to provide a user alarm message notifying that the power-saving management is being performed.

18. The apparatus of claim 13, wherein the management mode is divided into a normal mode, a primary management mode, and a secondary management mode, and wherein the secondary management mode is executed when the accumulated used electricity value at a time point corresponding to the specific sub section exceeds the sub section electricity reference value that is set up in the corresponding sub section, and when a current instantaneous electricity value is within a range of exceeding the set instantaneously used reference value, and wherein, in executing the secondary management mode, the control unit checks the used electricity amount of each electronic device, and wherein the control unit categorizes the electronic devices to necessary electronics device and unnecessary electronic devices, so as to perform power-saving management with respect to the necessary electronic devices and to perform power-blocking management with respect to the unnecessary electronic devices, and wherein, in executing the secondary management mode, the control unit further includes a step of adjusting the instantaneously used reference value to a low level value, and wherein, in executing the secondary management mode, the control unit uses a display means included in the electricity management apparatus and/or a display means included in the corresponding electronic device having the power-saving management or power-blocking management performed therein, and wherein the control unit performs management operations, so as to provide a user alarm message notifying that the power-saving management is being performed.

19. The apparatus of claim 13, wherein the instantaneous electricity reference value is set up to consist of a first instantaneous electricity reference value and a second instantaneous electricity reference value.

20. An electricity management method, comprising:
a reference value set-up step setting up an overall section, and setting up a maximum permissible electricity reference value and instantaneous electricity reference value respective to the set overall section;
when a current instantaneously used electricity value exceeds the set instantaneous electricity reference value, a step of calculating an electricity proportion value comparing a current accumulated used electricity value with respect to the set maximum permissible electricity reference value and calculating a section proportion value comparing a current time point of the specific section; and
an electricity management step deciding a management mode for each electronic device connected to the internal network, based upon the electricity proportion value and the section proportion value, and performing managing operations, so as to transmit electricity management information respective to the decided management mode.

21. An electricity management method, comprising:
a reference value set-up step setting up a maximum permissible electricity reference value corresponding to an overall section, an electricity reference value for each sub section after dividing the specific section to a plurality of sub sections, and an instantaneous electricity reference value;
a comparison step comparing an accumulated used electricity value at a time point corresponding to a specific sub section with a sub section electricity reference value being set up in the corresponding sub section, and comparing a current instantaneous electricity value with the set instantaneously used reference value; and
an electricity management step deciding a management mode for each electronic device being connected to the internal network, based upon the compared result, and performing control operations, so as to transmit electricity management information respective to the decided management mode.

* * * * *